United States Patent
Xia et al.

(10) Patent No.: US 12,219,555 B2
(45) Date of Patent: Feb. 4, 2025

(54) ENABLING LEGACY (NON-EHT) STATIONS TO OPERATE ON THE CONDITIONAL LINK OF A SOFT AP MLD

(71) Applicants: SONY GROUP CORPORATION, Tokyo (JP); SONY CORPORATION OF AMERICA, New York, NY (US)

(72) Inventors: Qing Xia, San Jose, CA (US); Mohamed Abouelseoud, Burlingame, CA (US); Li-Hsiang Sun, San Jose, CA (US); Liangxiao Xin, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 447 days.

(21) Appl. No.: 17/737,255

(22) Filed: May 5, 2022

(65) Prior Publication Data
US 2022/0400500 A1 Dec. 15, 2022

Related U.S. Application Data

(60) Provisional application No. 63/208,551, filed on Jun. 9, 2021.

(51) Int. Cl.
*H04W 72/1268* (2023.01)
*H04W 72/1273* (2023.01)
(Continued)

(52) U.S. Cl.
CPC ... *H04W 72/1268* (2013.01); *H04W 72/1273* (2013.01); *H04W 74/02* (2013.01); *H04W 76/15* (2018.02); *H04W 84/12* (2013.01)

(58) Field of Classification Search
CPC ......... H04W 72/1268; H04W 72/1273; H04W 74/02; H04W 76/15; H04W 84/12; H04W 74/06; H04W 74/0808; H04W 74/04
See application file for complete search history.

(56) References Cited

U.S. PATENT DOCUMENTS

2006/0215694 A1* 9/2006 Lu .......................... H04W 74/02
370/468
2012/0294255 A1* 11/2012 Seok ..................... H04W 84/12
370/329
(Continued)

FOREIGN PATENT DOCUMENTS

EP 3790346 A1 3/2021

OTHER PUBLICATIONS

Jinjing Jiang, "Operation with Non-STR AP", Apple, Inc., doc.: IEEE 802.11-20/755r1, May 15, 2020, pp. 1-12.
(Continued)

*Primary Examiner* — Hardikkumar D Patel
(74) *Attorney, Agent, or Firm* — O'BANION & RITCHEY LLP; John P. O'Banion

(57) ABSTRACT

A wireless communications protocol for enabling legacy (non-EHT) stations (STAs) to operate on the conditional link of the Soft AP MLD. Legacy devices can connect and setup link connections on the conditional link, and the scheduler is configured to allow legacy STAs to use the conditional link if there is no IDC interference issue at the soft AP MLD. This enhanced protocol utilizes either a cooperative HCCA schedule created for simultaneous transmission and reception over the basic link and conditional link, or an adaptive polling-based scheduling performed for the conditional link in response to the link status of the basic link.

26 Claims, 33 Drawing Sheets

(51) Int. Cl.
*H04W 74/02* (2009.01)
*H04W 76/15* (2018.01)
*H04W 84/12* (2009.01)

(56) References Cited

U.S. PATENT DOCUMENTS

2017/0142638 A1* 5/2017 Wang .................... H04W 12/06
2021/0076437 A1 3/2021 Kneckt

OTHER PUBLICATIONS

Shubhodeep Adhikari (Broadcom): "Proposals for an NSTR soft Ap", IEEE Draft; 11-20-1540-00-00BE-PROPOSALS-for-an-NSTR-Soft-AP, IEEE-SA Mentor, Piscataway, NJ USA, vol. 802.11 EHT; 802.11be, Sep. 30, 2020 (Sep. 30, 2020), pp. 1-21, XP068173662.
Yongho Seok (Mediatek): "Synchronous Multi-link Operation", IEEE Draft; 11-19-1305-01-00BE-Synchronous-Multi-Link-Operation, IEEE-SA Mentor, Piscataway, NJ USA, vol. 802.11 EHT; 802.11be, No. 1, Mar. 16, 2020 (Mar. 16, 2020), pp. 1-9, XP068167073.

* cited by examiner

FIG. 4
(Prior Art)

| Element ID | Length (#4 056) | TS Info | Nominal MSDU Size | Maximum MSDU Size | Minimum Service Interval | Maximum Service Interval | Inactivity Interval | Suspension Interval |
|---|---|---|---|---|---|---|---|---|
| 1 | 1 | 3 | 2 | 2 | 4 | 4 | 4 | 4 |

Octets:

| Service Start Time | Minimum Data Rate | Mean Data Rate | Peak Data Rate | Burst Size | Delay Bound | Minimum PHY Rate | Surplus Bandwidth Allowance | Medium Time | DMG Attributes |
|---|---|---|---|---|---|---|---|---|---|
| 4 | 4 | 4 | 4 | 4 | 4 | 4 | 2 | 2 | 0 or 2 |

Octets:

FIG. 5
(Prior Art)

| B0 | B1 B4 B5 | B6 B7 B8 | B9 | B10 | B11 B13 | B14 B15 B16 B17 | B23 |
|---|---|---|---|---|---|---|---|
| Traffic Type | TSID | Direction | Access Policy | Aggregation | APSD | User Priority | TS Info Ack Policy | Schedule | Reserved |
| 1 | 4 | 2 | 2 | 1 | 1 | 3 | 2 | 1 | 7 |

Bits:

ENABLING LEGACY (NON-EHT) STATIONS TO OPERATE ON THE CONDITIONAL LINK OF A SOFT AP MLD

CROSS-REFERENCE TO RELATED APPLICATIONS

This application claims priority to, and the benefit of, U.S. provisional patent application Ser. No. 63/208,551 filed on Jun. 9, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network protocols for operation on multi-link device (MLD) stations, and more particularly to enabling legacy (non-EHT) MLD stations to use conditional links of a soft Access Point MLD.

2. Background Discussion

A Hybrid Coordination Function (HCF) was proposed in IEEE 802.11e to provide Quality-of-Service (QoS) for real-time applications. The protocol uses an Enhanced Distributed Channel Access (EDCA) mechanism for contention based transfer and a controlled channel access, referred to as HCF Controlled Channel Access (HCCA) mechanism, for contention-free transfer. EDCA defines multiple Access Categories (AC) with AC-specific Contention Window (CW) sizes, Arbitration Interframe Space (AIFS) values, and Transmit Opportunity (TXOP) limits in support QoS and prioritization at the MAC level. These standards are directed towards stations with Extremely High Throughput (EHT) that are designed to provide Wi-Fi over 2.4 GHz, 5 GHz, and 6 GHz frequency bands.

Under that protocol a soft AP MLD is designed to normally communicate with legacy (non-EHT) STAs only on the basic link to prevent In-Device Coexistence (IDC) interference; thus, limiting attainable quality of service and performance.

As a result, the ability for legacy (non-EHT) devices to operate on these advanced networks is severely limited.

Accordingly, a need exists for advanced means of handling Soft AP issues when enabling legacy (non-EHT) stations. The present disclosure addresses those needs and provides additional benefits.

BRIEF SUMMARY

The present disclosure is a protocol that allows enabling non-EHT legacy STAs which, for example may be configured for High Throughput (HT), Very High Throughput (VHT) or High Efficiency (HE) protocols, to operate on the conditional link of the Soft AP MLD. Legacy devices can connect and setup link connections on the conditional link through active or passive scanning. The scheduler is configured to allow legacy STAs to use the conditional link if no IDC interference issue will be introduced at the soft AP MLD.

In previous protocols, in order to prevent the IDC interference issue at the soft AP side, the soft AP MLD protocol can only communicate with legacy (non-EHT) STAs on the basic link; which degrades service quality and throughput for legacy STAs by limiting their channel resources.

This enhanced protocol allows overcoming these issues with two primary methodologies. In a first methodology, a cooperative HCCA schedule is created for simultaneous transmission and reception over the basic link and the conditional link. In a second methodology, adaptive polling-based scheduling is performed for the conditional link according to basic link status.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram of a Traffic Specification (TSPEC) element used in admission control in parameterized Quality-of-Service (QoS).

FIG. 5 is a data field diagram depicting subfields within the TS Info field shown in FIG. 4.

DETAILED DESCRIPTION

1. Introduction 1.1. Hybrid Coordination Function (HCF)

Proposed in IEEE 802.11e to provide QoS for real-time applications. Consists of Enhanced Distributed Channel Access (EDCA) mechanism for contention based transfer and a controlled channel access, referred to as the HCF Controlled Channel Access (HCCA) mechanism, for contention free transfer.

1.2. HCF Controlled Channel Access (HCCA)

HCCA uses a Quality-of-Service (QoS)-aware centralized coordinator, named a Hybrid Coordinator (HC), to initiate frame exchange sequences and to allocate Transmit Opportunities (TXOPs) to itself and other Stations (STAs) for contention-free (CF) transmission for QoS DATA. The HC has a higher Medium-Access (MAC) priority than non-Access Point (non-AP) STAs. The HC grants a STA a polled TXOP with a duration specified in a QoS (+) CF-Poll frame. A STA may initiate multiple frame exchange sequences during a polled TXOP, subject to the limit on TXOP duration.

The HC has access to the Wireless Medium (WM) to start a Controlled Access Phase (CAP) when the Wireless Medium (WM) is determined to be idle at the Transmit (Tx) PCF Interframe Space (PIFS) slot boundary. The HC shall transmit either a QoS(+)CF-Poll or the first frame of any permitted frame exchange sequence with the duration value set to cover the polled TXOP or the HCCA TXOP, respectively.

A CAP shall not extend across a Target Beacon Transmission Time (TBTT) with a time interval measured in time units (TUs). The occurrence of TBTT implies the end of the CAP, after which a regular channel access procedure (EDCA or HCCA) is resumed. The HC may sense the channel and reclaim the channel if the WM is determined to be idle at the TxPIFs slot boundary after the HCCA TXOP. The CAP ends when the HC does not reclaim the channel at the TxPIFS slot boundary after the end of an HCCA TXOP.

Figure 1:
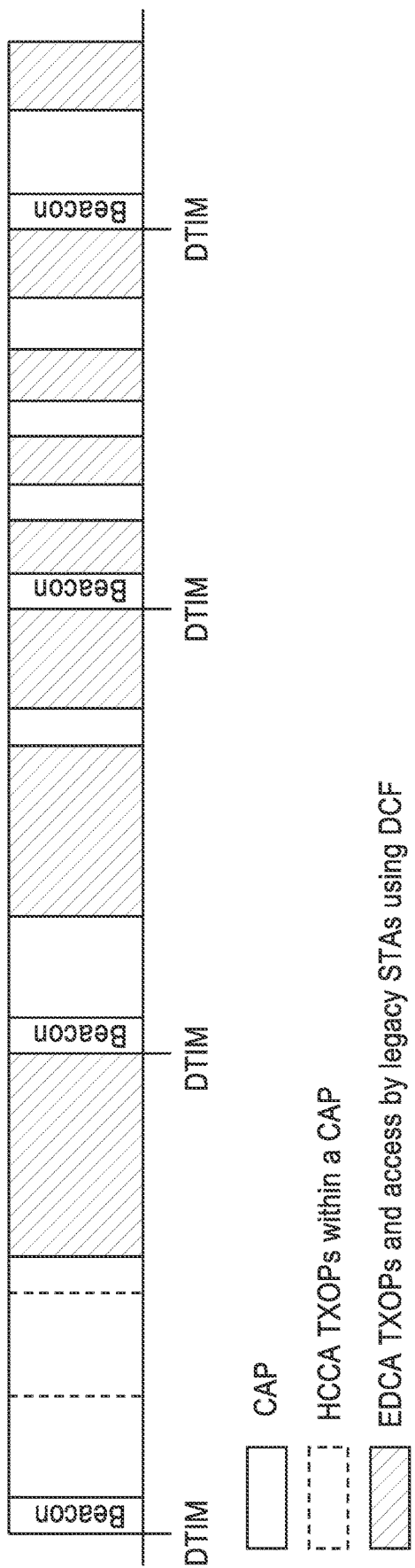
FIG. 1 is a communication diagram of a Controlled Access Phase (CAP) showing HCF Controlled Channel Access (HCCA) Transmission Opportunities (TXOPs) within a CAP, and Enhanced Distributed Channel Access (EDCA) TXOPs with access by legacy STAs using Distributed Coordination Function (DCF).

FIG. 1 depicts a Controlled Access Phase (CAP) showing HCCA TXOPs within a CAP, and EDCA TXOPs and access by legacy STAs using a Distributed Coordination Function (DCF). In the figure are seen Delivery Traffic Indication Messages (DTIMs) whose period value is a number that determines how often a beacon frame includes a DTIM, and this number is included in each beacon frame. At the start of each DTIM is seen a beacon. As shown in the figure during CAP or HCCA TXOP, or EDCA TXOP periods, the HC can poll the QoS STAs during EDCA TXOPs. The CAP consists of not only HCCA TXOPs but also portions of EDCA TXOPs.

1.3. Types of TXOPs

An Enhanced Distributed Channel Access (EDCA) TXOP is a TXOP obtained using Arbitration Inter-Frame Spacing (AIFS), which is a method of prioritizing one Access Category (AC) over the other categories. The length of EDCA Function (EDCAF) TXOP is specified in beacon frames.

An HCCA TXOP is a TXOP is obtained using PIFS.

A Polled TXOP is the result of an HCCA TXOP being obtained due to a QoS(+)CF-Poll from the HC. The length of polled TXOP is specified in the QoS(+)CF-Poll frame.

Figure 2:
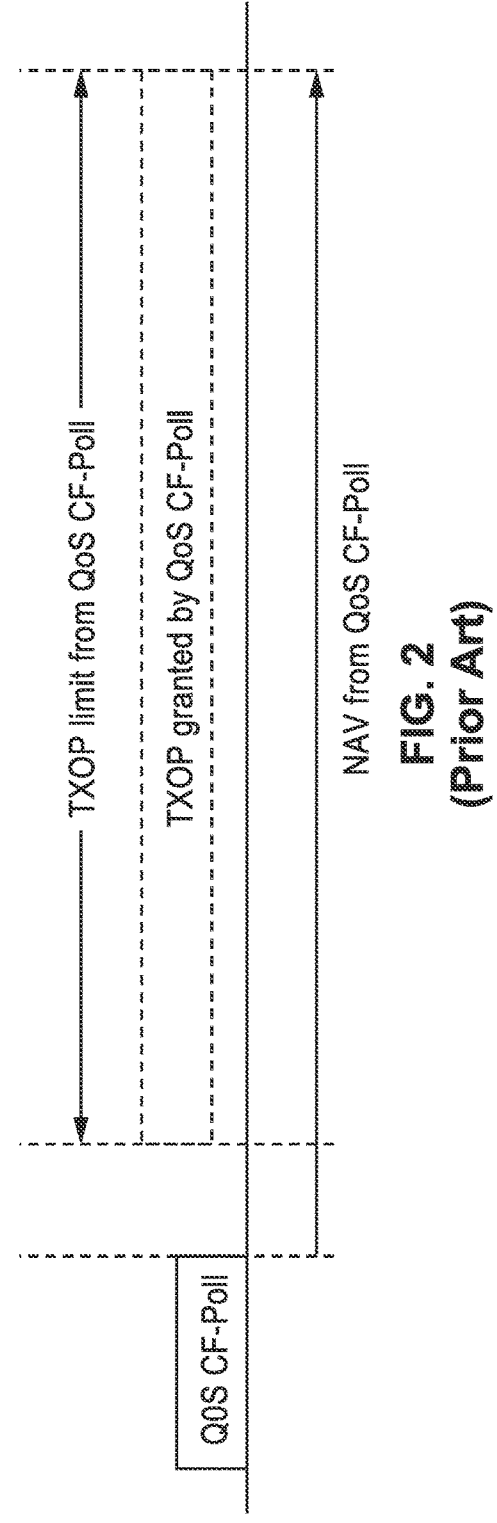
FIG. 2 is a communication diagram of a general polled TXOP.

FIG. 2 depicts an example of a polled TXOP. After gaining channel access, the HC polls QoS STAs in turn with QoS(+)CF-Poll. Non-AP STAs that receives a QoS(+)CF-Poll shall respond within a SIFS, regardless of the NAV setting.

If a polled QoS STA has no queued traffic to send or if the MPDUs to be sent are too long within the specified TXOP limit, then the QoS STA shall send a QoS (+)Null frame to indicate corresponding queue size for HC to reallocate TXOP. Within a polled TXOP, the unused portion of TXOPs shall not be used by STAs and may be reallocated by the HC. The polled TXOP is protected by the NAV set by the Duration field of the QoS(+)CF-Poll frame as shown in the figure. All transmissions, including response frames, within the polled TXOP are considered to be the part of the TXOP. Subject to the polled TXOP limitations, all decisions regarding what MAC Service Data Units (MSDUs), A-MSDUs, and/or MAC Management Protocol Data Units (MMPDUs) are transmitted during any given TXOP are made by the STA that holds the TXOP.

1.4. Admission Control at the HC

Admission control at the HC is utilized toward providing a guarantee of the amount of time that a STA has available access to the channel. The Hybrid Coordinator (HC) is used to administer admission control in the network.

Contention based admission control is utilized in which the AP uses the ACM (Admission Control Mandatory) subfields advertised in the EDCA Parameter Set element to indicate whether admission control is required for each of the ACs. The ACM subfield shall be static for the duration of the lifetime of the Basic Service Set (BSS). A STA shall transmit an ADD Traffic Stream (ADDTS) request frame to the HC in order to request admission of traffic in any direction employing an AC that requires admission control.

The ADDTS Request frame shall contain the User Priority (UP) associated with the traffic and shall indicate EDCA as the access policy.

At non-AP STAs, each EDCA Function (EDCAF) shall maintain two MAC variables: the allowed medium time, admitted_time, by AP and the amount of used time, named as used_time. The STA shall compute the admitted_time for the specified EDCAF after negotiating with the AP by ADDTS request and response frame exchanges. The STA updates the value of used_time at certain times, such as after each successful or unsuccessful frame exchange.

If the used_time value reaches or exceeds the admitted_time value, the corresponding EDCAF shall no longer transmit QoS Data frames or QoS Null frames using the EDCA parameters for that AC as specified in the QoS Parameter Set element.

However, a STA may choose to temporarily replace the EDCA parameters for that EDCAF with those specified for an AC of lower priority, if no admission control is required for those ACs.

1.5. Controlled-Access Admission Control

The Hybrid Coordinator (HC) is responsible for granting or denying polling service to an admitted TS based on the associated TSPEC. The polling service based on admitted TS provides a "guaranteed channel access" from the scheduler in order to have its QoS requirements met. If a TS is admitted by the HC, the scheduler shall service the STA during a Service Period (SP), which starts at fixed intervals of time. An AP shall schedule the transmissions in HCCA TXOPs and communicate the service schedule to the STA. The service schedule could be subsequently updated by an AP as long as it meets TSPEC requirements. The HC may update the service schedule at any time by sending a Schedule element in a Schedule frame. The updated schedule is in effect when the HC receives the Ack frame for the Schedule frame.

1.6. QoS(+)CF-Poll Frame

Figure 3:
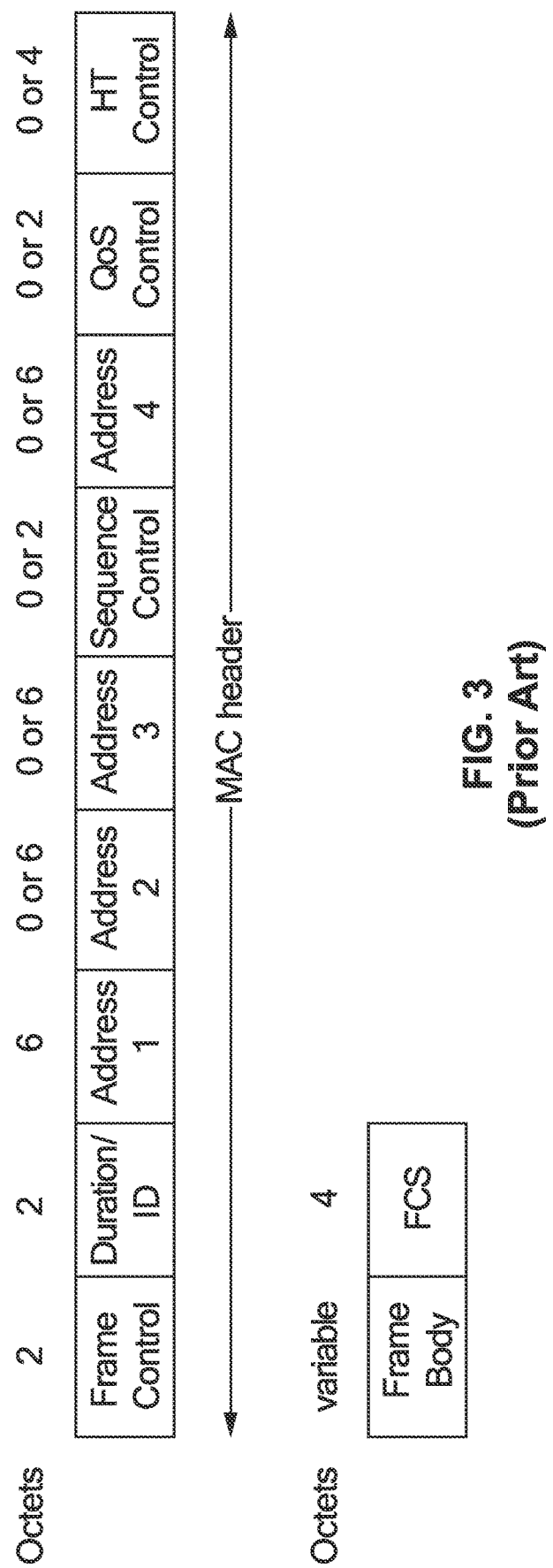
FIG. 3 is a data field diagram of a QoS(+)CF-Poll frame format.

FIG. 3 depicts a QoS(+)CF-Poll frame format, having the following fields. A Frame control field specifies the protocol version, type, subtype, and corresponding frame control information. A QoS (+)CF-Poll frame refers to all four QoS data subtypes with CF-Poll: the QoS CF-Poll frame, subtype 1110; the QoS CF-Ack+CF-Poll frame, subtype 1111; the QoS Data+CF-Poll frame, subtype 1010; and the QoS Data+CF-Ack+CF-Poll frame, subtype 1011.

Within a Data frame containing QoS CF-Poll, the Duration/ID field value is set to one of the following: (a) one SIFS plus the TXOP limit, if the TXOP limit is nonzero, or (b) the time required for the transmission of one MPDU of nominal MSDU size and the associated Ack frame plus two SIFSs, if the TXOP limit is 0.

The Address 1 field identifies the intended receiver of the frame; the Address 2 field identifies the transmitter of the frame.

A Sequence Control field specifies the sequence number and fragment number, which is not present in control frames. A QoS Control field identifies the TC or TS to which the frame belongs as well as various other QoS-related, A-MSDU related, and mesh-related information about the frame that varies by frame type, subtype, and type of transmitting STA.

An HT Control field indicates HT control information for the HT variant and VHT variant. A Frame Body field contains information specific to individual frame types and subtypes. An FCS field contains a 32-bit Cyclic Redundancy Check (CRC). The FCS field value is calculated over all of the fields of the MAC header and the Frame Body field.

1.7. TSPEC Element

FIG. 4 depicts a Traffic Specification (TSPEC) element used in admission control in parameterized QoS. This provides an information element of management frames (e.g., ADDTS request/response, ADDTS Reserve Request, DMS Request/Response, and so forth). It also defines the characteristics and QoS expectation of a traffic stream.

Main parameters of TSPEC include the following. The Delay Bound field specifies the maximum amount of time, in microseconds, allowed to transport an MSDU or A-MSDU belonging to the TS in this TSPEC. The Service Start Time (us): indicates the time when a STA first expects to be ready to send frames and a STA in Power Saving (PS) mode needs to be awake to receive these frames.

A Minimum Service Interval specifies the minimum interval (in us) between the start of two successive SPs.

A Maximum Service Interval field works as follows. When the TSPEC element is for admitting HCCA streams, it specifies the maximum interval, in microseconds, between the start of two successive SPs. If the TSPEC element is intended for EDCA Admission Control, then the Maximum Service Interval field indicates a latency limit, which limits the amount of aggregation (A-MSDU or A-MPDU) used, so that excessive latency does not occur.

An Inactivity Interval field specifies the minimum amount of time, in microseconds, that can elapse without arrival or transfer of an MPDU belonging to the TS before this TS is deleted by the MAC entity at the HC.

The Suspension Interval field specifies the minimum amount of time, in microseconds, that can elapse without arrival or transfer of an MSDU belonging to the TS before the generation of successive QoS(+)CF-Poll is stopped for this TS. A specific value, such as 4 294 967 295 (=2$^{32}$−1), disables the suspension interval, indicating that polling for the TS is not to be interrupted based on inactivity.

The Service Start Time field specifies the time, in microseconds, when the first scheduled SP starts. The service start time indicates to the AP the time when a STA first expects to be ready to send frames and a power saving (e.g., M101—Wi-Fi SiP module) STA needs to be awake to receive frames. If APSD and Schedule subfields are 0, this field is also set to 0 (unspecified).

The Delay Bound field specifies the maximum amount of time, in microseconds, allowed to transport an MSDU or A-MSDU belonging to the TS in this TSPEC Element, measured between the time marking the arrival of the MSDU, or the first MSDU of the MSDUs constituting an A-MSDU, at the local MAC sublayer from the local MAC SAP and the time of completion of the successful transmission or retransmission of the MSDU or A-MSDU to the destination.

The completion of the MSDU or A-MSDU transmission includes the relevant acknowledgment frame transmission time, if present.

The Medium Time field contains the amount of time admitted for accessing the medium, in units of 32 us/s. This field is reserved in the ADDTS Request frame and is set by the HC in the ADDTS Response frame. This field is not used for controlled channel access.

FIG. 5 depicts the subfields within the TS Info field shown in FIG. 4.

2. Motivation and Problem

One of the primary motivations for the present disclosure is to prevent an IDC interference issue at the soft AP side. Typically, a soft AP MLD designed to communicate with legacy STAs only on the basic links so as to prevent such interferences.

This rule degrades the service quality for legacy STAs by heavily limiting/shrinking their channel resources. This degradation can introduce increased delay and decreased throughput, which severely impacts the performance on legacy STAs, especially for RTA.

If the basic links are the 2.4 GHz and 5 GHz links and the conditional link is the 6 GHz link, then the following problems arise. Legacy STAs that support 2.4 GHz, 5 GHz and 6 GHz links (e.g., HE STAs) would waste the advantages of using 6 GHz channel, which has much wider bandwidth and much less client density than basic links.

If the basic link is the 2.4 GHz and 6 GHz links and the conditional link is the 5 GHz link, then the following issues arise. Legacy STAs that only support a 5 GHz channel (e.g., VHT STAs) will not be able to operate at all. Legacy STAs that support 2.4 GHz and 5 GHz channels (e.g., HT STAs) will only be able to operate at 2.4 GHz, and thus would waste all channel resources of the 5 GHz channel.

In summary, if legacy devices are only allowed to use basic links only, then this severely limits the options for legacy devices. Thus, the present disclosure discusses a system and method to enable all legacy STAs (HT, VHT and HE) to operate on conditional links as well. Legacy devices can connect on conditional links through active or passive scanning. The legacy STAs are able to setup link connections on conditional links. The scheduler shall not prevent legacy STAs from using the conditional link if no IDC interference issue will be introduced at the soft AP MLD.

3. Hardware Embodiments

The ability to enable legacy (non-EHT) stations to operate on the conditional link of a soft AP MLD can be implemented in a variety of 802.11 hardware configurations, the following being provided by way of example and not limitation.

3.1. Station Hardware Configuration

Figure 6:
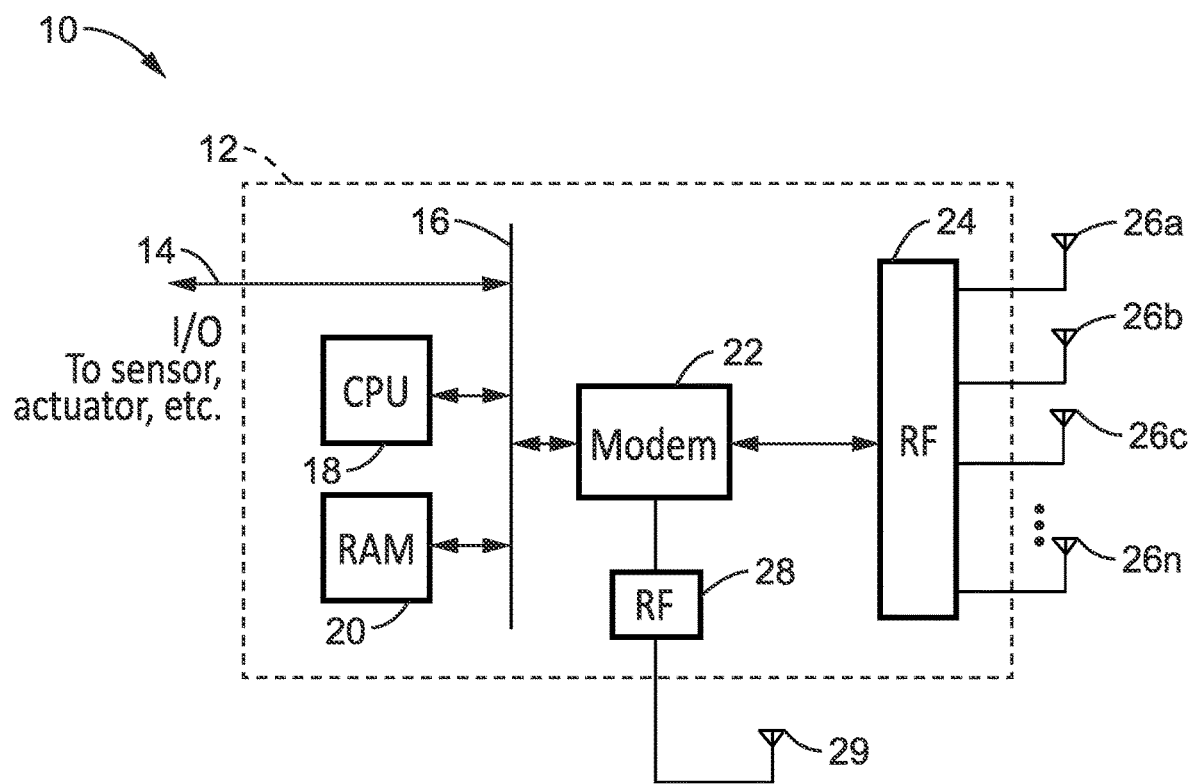
FIG. 6 is a hardware block diagram of wireless station (STA) hardware according to at least one embodiment of the present disclosure.

FIG. 6 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26*a*, 26*b*, 26*c* through 26*n*. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinate, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 7:
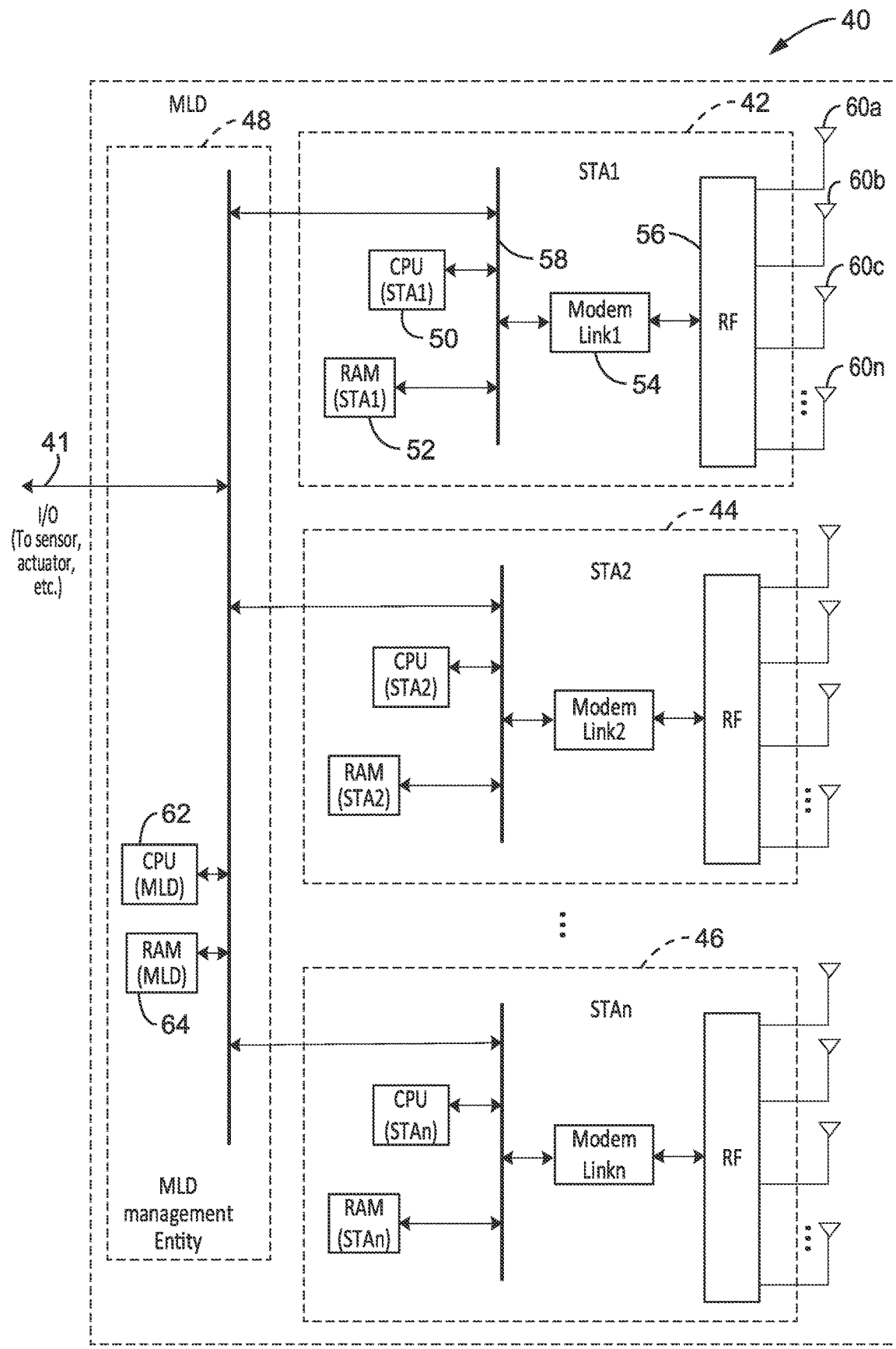
FIG. 7 is a hardware block diagram of a station configuration, such as contained in Multi-Link Device (MLD) hardware, according to at least one embodiment of the present disclosure.

FIG. 7 illustrates an example embodiment 40 of a Multi-Link Device (MLD) hardware configuration. Soft AP MLD is a MLD that consists of one or more affiliated STAs, which are operated as APs. Soft AP MLD should support multiple radio operation on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implement communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4. Network Topology

Figure 8:
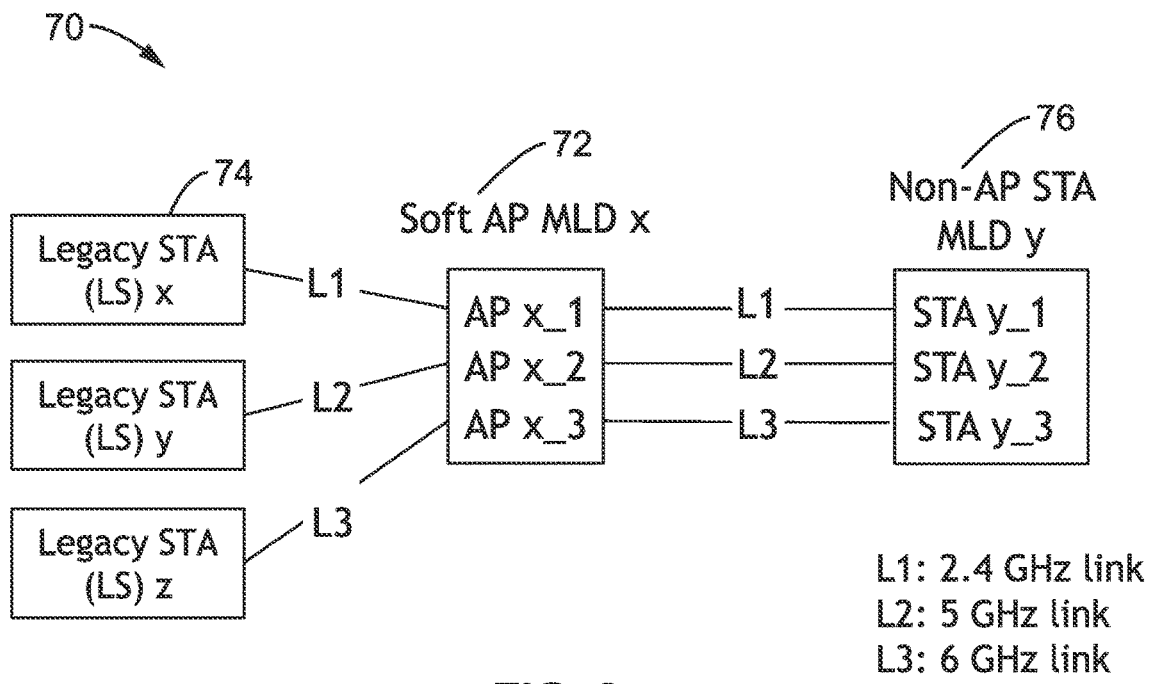
FIG. 8 is a network topology of general multiple link connections according to at least one embodiment of the present disclosure.

FIG. 8 illustrates an embodiment of an example network topology 70 of general multiple link connections. A soft AP MLDx 72 is shown connecting to legacy stations 74 and a non-AP STA MLDy 76 through multiple wireless links.

The soft AP MLD (EHT device) has an identification (ID) denoted as "x", while any non-AP MLD (EHT device) is exemplified with MLD ID denoted as "y", while any legacy STAs (non-EHT device) is denoted with an ID as Legacy System (LS) "x, y and z". In the example, the soft AP MLD x has three affiliated AP stations which are denoted as APx_1, APx_2 and APx_3. The non-AP MLD y has 3 affiliated non-AP stations which are denoted as STAy_1, STAy_2 and STAy_3. APx_1, STAy_1 and LSx are operating over link1 (L1). APx_2, STAy_2 and LSy are operating over link2 (L2), while APx_3, STAy_3 and LSz are operating over link3 (L3).

Figure 9:
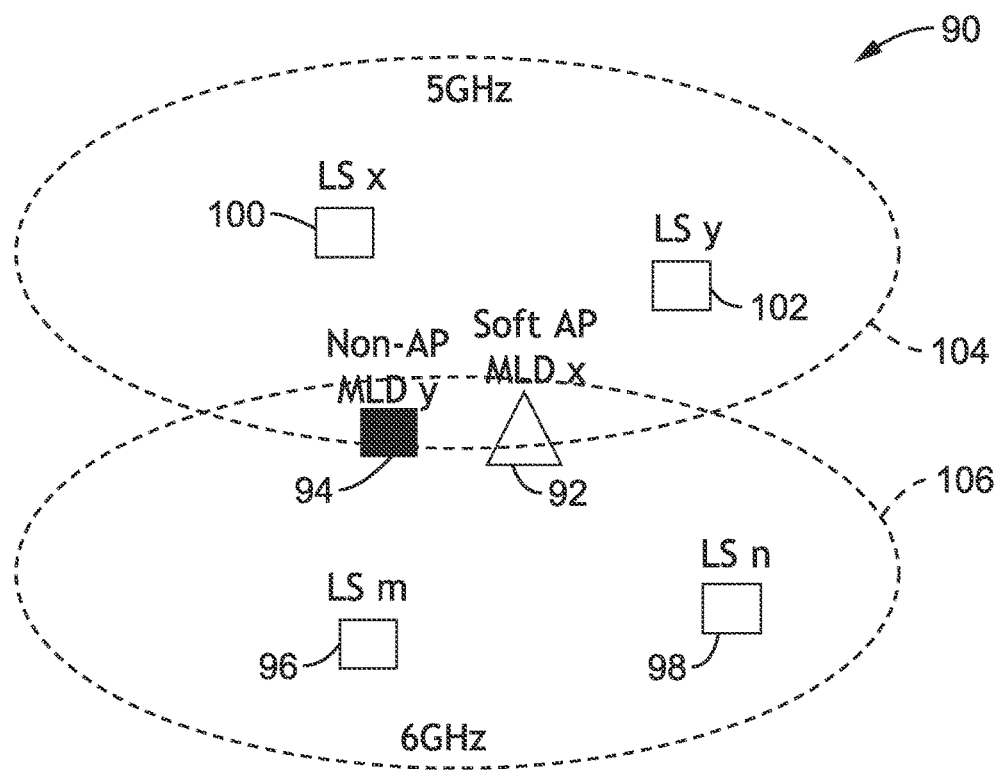
FIG. 9 is a network topology including a soft AP MLDx and a non-AP MLDy general multiple link connections according to at least one embodiment of the present disclosure.

FIG. 9 illustrates an embodiment 90 exemplifying a network topology used for purposes of discussion, and not by way of limitation. Soft AP MLDx 92 and non-AP MLDx 94 operate on both 5 GHz 104 and 6 GHz 106 links. LSx 100 and LSy 102 only operate on the 5 GHz link. LSm 96 and LSn 98 only operate on the 6 GHz link 106. Since the 2.4 GHz link is a basic link that is isolated, such as not subject to IDC interference, from either the 5 GHz link or the 6 GHz link, the following discussion will not include considerations of the 2.4 GHz link.

Figure 10A:
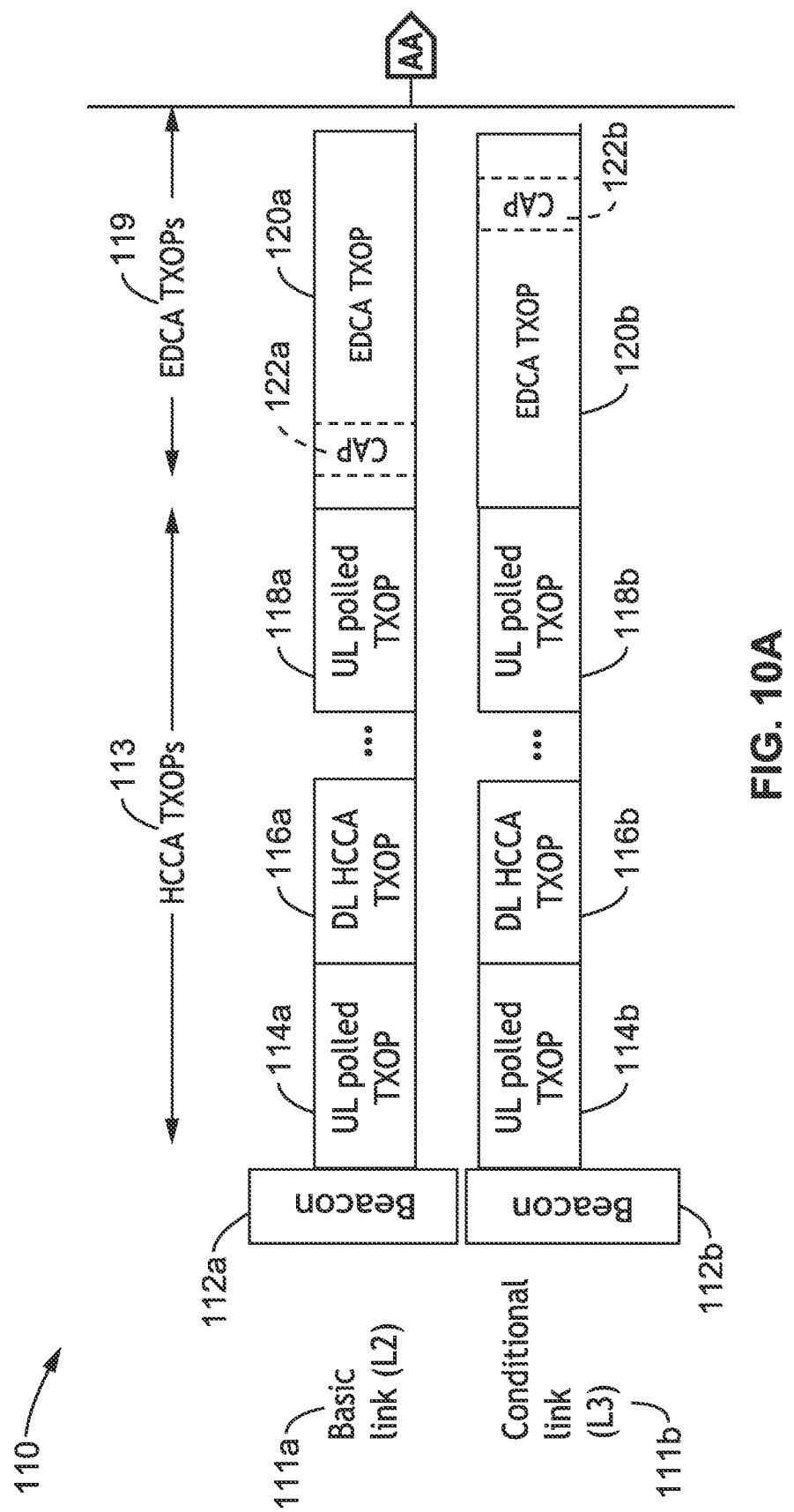
FIG. 10A and FIG. 10B is a communication diagram of cooperative HCCA scheduling for NSTR over a basic link and a condition link according to at least one embodiment of the present disclosure.
Figure 10B:
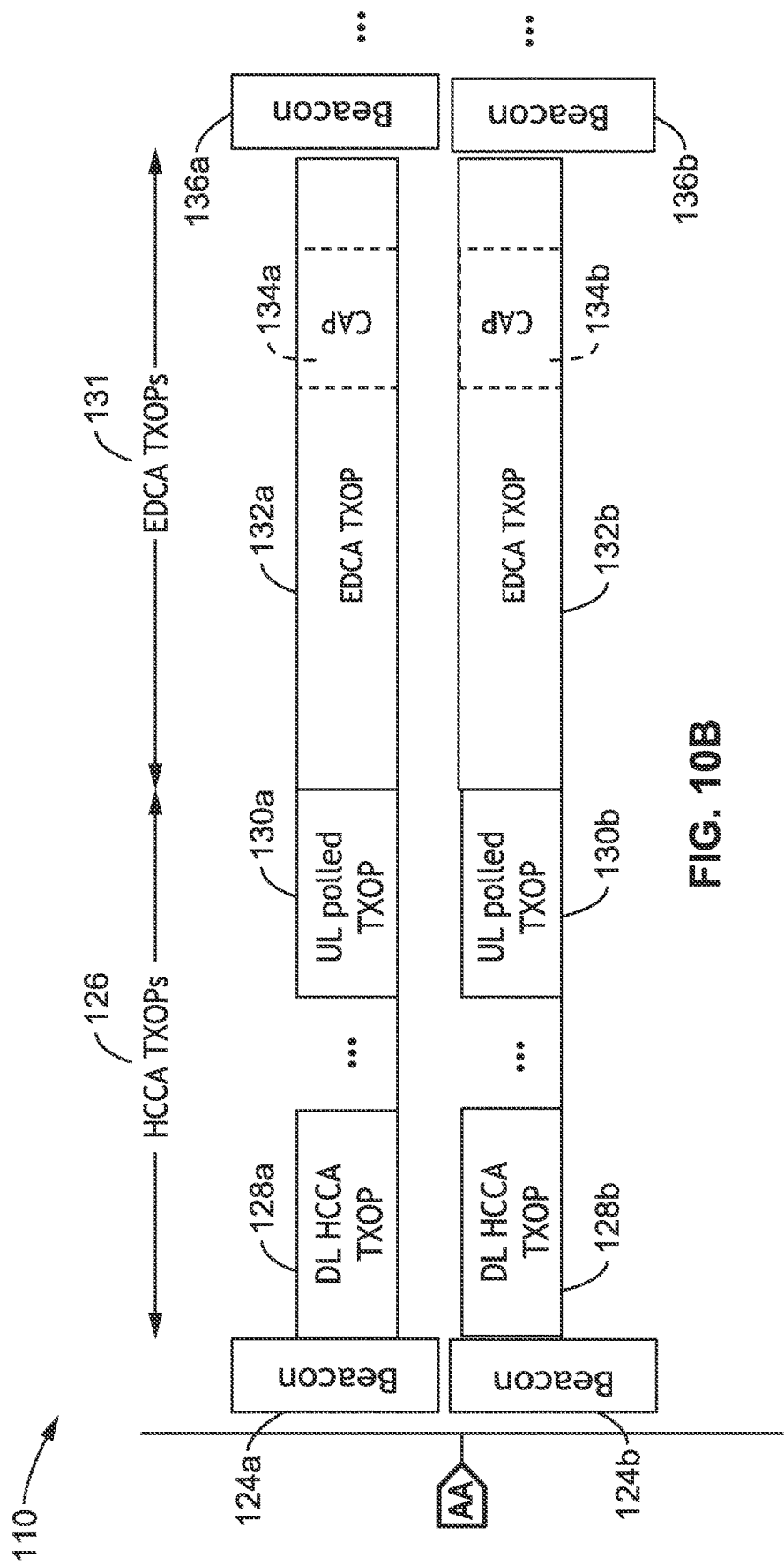

5. Enabling Legacy STAs on the Conditional Link of a Soft AP MLD 5.1. Solution 1: Cooperative HCCA Schedule for NSTR over the Basic Link and Conditional Link FIG. 10A and FIG. 10B illustrate an example embodiment 110 of a cooperative HCCA schedule for NSTR over a basic link 111a and a conditional link 111b.

APs on the conditional link and basic link have the same SME and are configured in the present disclosure to: (1) cooperate with each other to process simultaneous EDCA TXOPs and HCCA TXOPs over the basic link and the conditional link, and (2) for scheduling and allocating synchronized UL or DL HCCA TXOP over both links.

Admission control shall be applied to both links. Initial TS setup and negotiation shall progress mainly in EDCA TXOPs (as shown in example 1-1), the admitted access policy shall be HCCA on both the basic link and conditional link. MLDs that listen on both basic link and conditional link can perform EDCA access during EDCA TXOPs on both links.

The affiliated APs of the soft AP MLD shall schedule synchronized HCCA TXOP 113, 126 on both links based on the admitted SP information obtained from TS setup, such as including mean data rate, nominal MSDU size, minimum PHY rate, surplus bandwidth allowance, and at least one of maximum service interval and delay bound, and other fields as desired.

The affiliated APs of the soft AP MLD obtain information, such as TID, queued traffic of the STA corresponding to specific TID or the next TXOP duration request for traffic belonging to a specific TID from the TID subfield and the QoS Control subfield of the received QoS Data frames for all MSDU. The AP may reallocate TXOPs if the request belongs to the TS.

The AP shall reallocate HCCA TXOPs if a stream is added or dropped. The Service Interval (SI) for different admitted TS are not necessarily the same. The APs shall schedule TXOP accordingly. There may be multiple frame exchange sequences within a HCCA TXOP, subject to the limit on TXOP duration. The data exchange, as a PPDU, on the basic link and conditional link should be aligned at both start time and end time. The figure depicts beacons 112a, 112b followed by UL polled TXOPs 114a, 114b, DL HCCA TXOPs 116a, 116b through HCCA TXOPs up to UL polled TXOPs 118a, 118b at the end of the HCCA TXOP period. A PPDU is a Physical Layer Protocol Data Unit in the protocol and contains preamble and data fields. It will be noted that each of these TXOP are aligned between the basic and conditional link at both their start and at their end times. This also continues in FIG. 10B after another set of beacons 124a, 124b with HCCA TXOPs 126 exemplified as DL HCCA TXOPs 128a, 128b through to UL polled TXOPs 130a and 130b.

Soft AP MLD, non-AP MLD and legacy STAs may use any type of padding to align the end time of transmitted PPDUs. The scheduling algorithm among two links is out of the scope of this proposal. A PS STA wakes up at DTIM to receives a beacon and shall gain (obtain) some information such as QoS info and admission info.

The figure also exemplifies the presence of EDCA TXOP periods 119 and 131. In FIG. 10A is seen an EDCA TXOP 120a with CAP 122a, and EDCA TXOP 120b with an optional CAP 122, exemplified near its end. In FIG. 10B is seen an EDCA TXOPs 132a, 132b with CAPs 134a, 134b, after which another set of beacons 136a, 136b are sent out.

For this solution, the access limitation shall apply for basic link and conditional link. So, on both links: Beacon frame shall specify ACM (admission control mandatory)=1 for all ACs. The TS setup process shall be executed as described in example 1-1. During admission control, soft APs on basic link and conditional link shall specify access policy as HCCA with ADDTS response frames by setting Access Policy subfield in TSPEC element to specifies the access method to be used for the TS is HCCA. Non-AP STAs accept admission rule shall perform channel access policy as HCCA.

Figure 11:
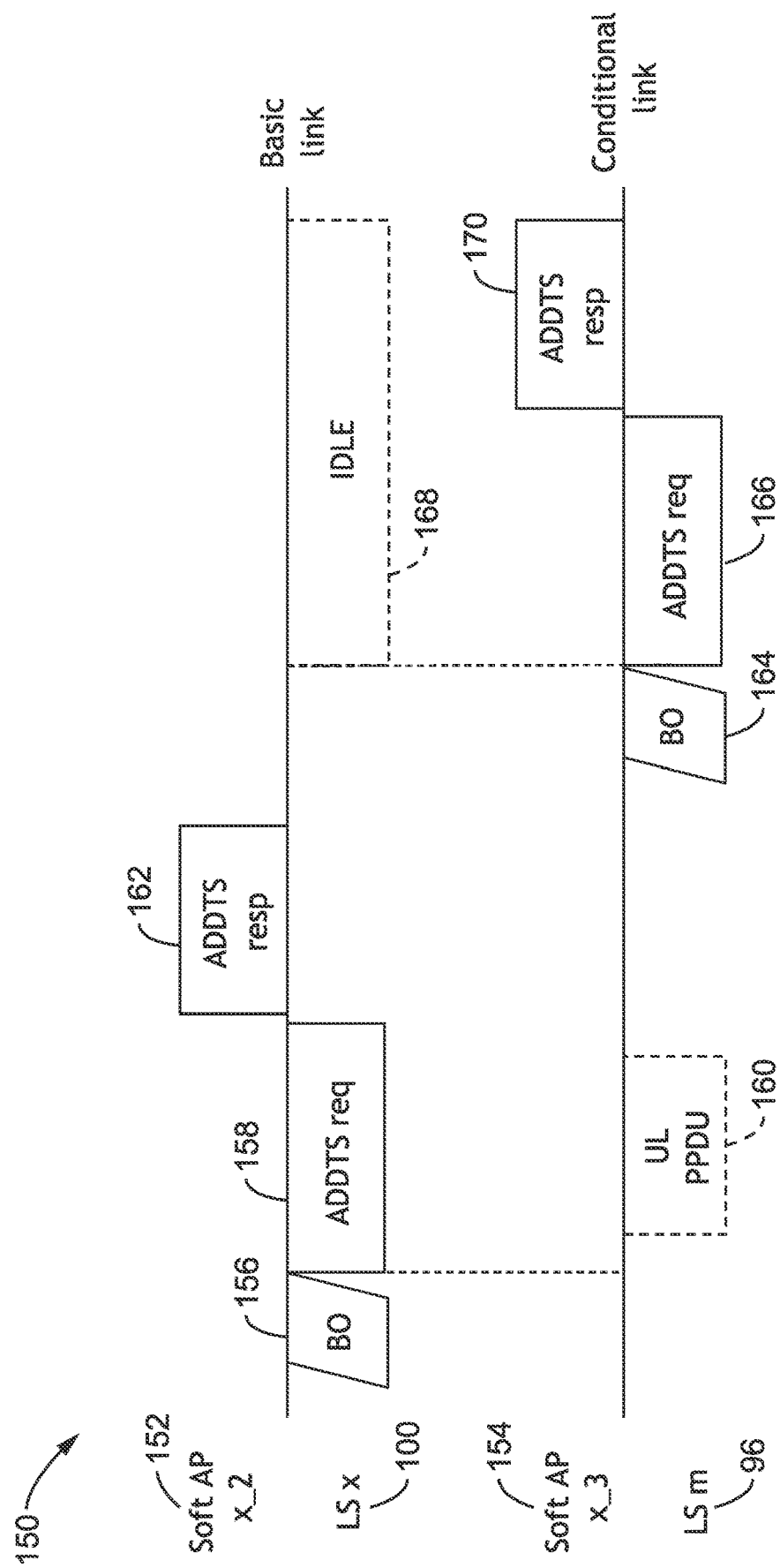
FIG. 11 is a communications diagram of admission control by frame exchange of an ADDTS based on non-trigger-based TXOP according to at least one embodiment of the present disclosure.
Figure 12A:
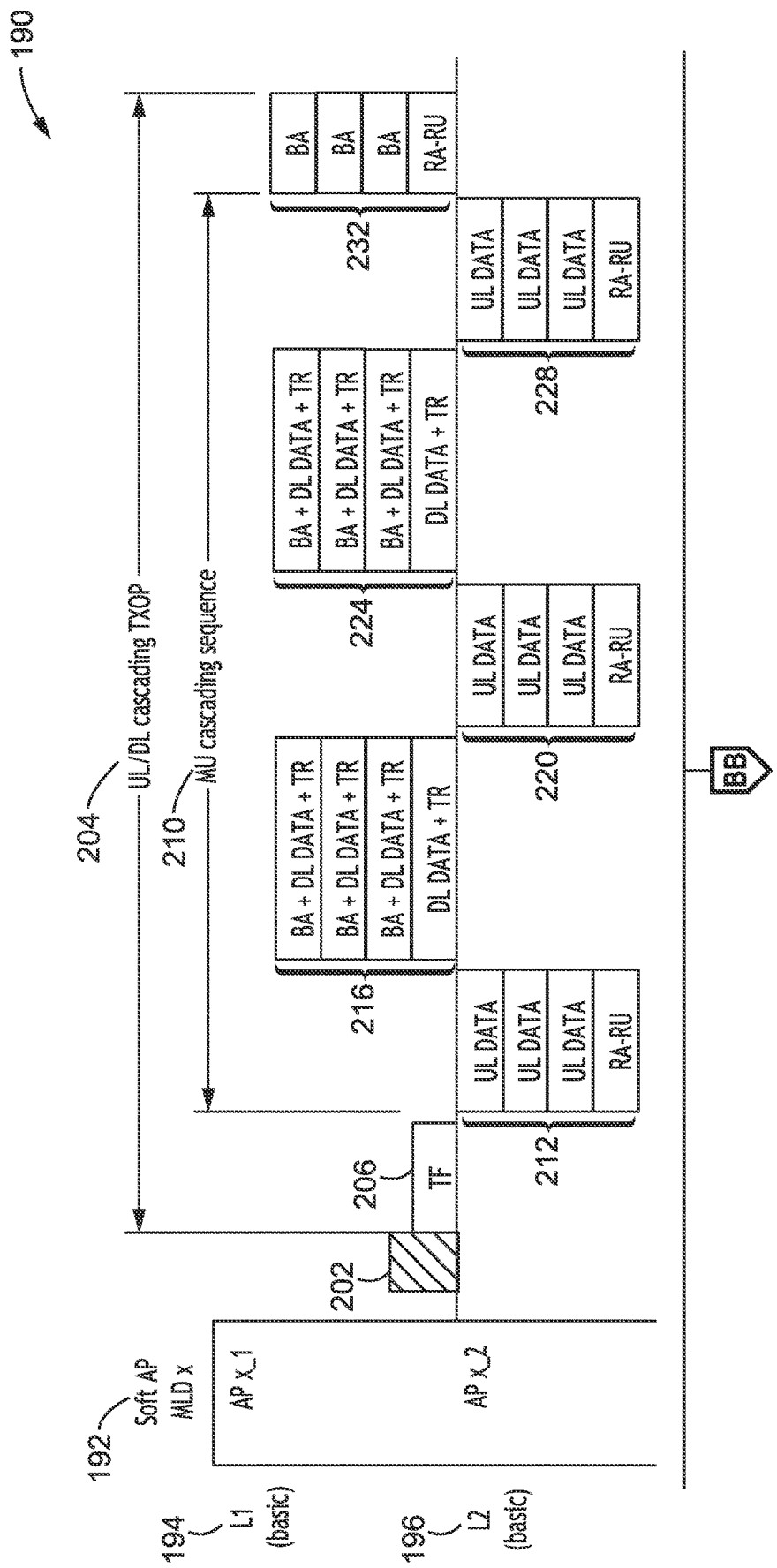
FIG. 12A and FIG. 12B is a communications diagram of TS setup through trigger-based TXOP cascading according to at least one embodiment of the present disclosure.
Figure 12B:
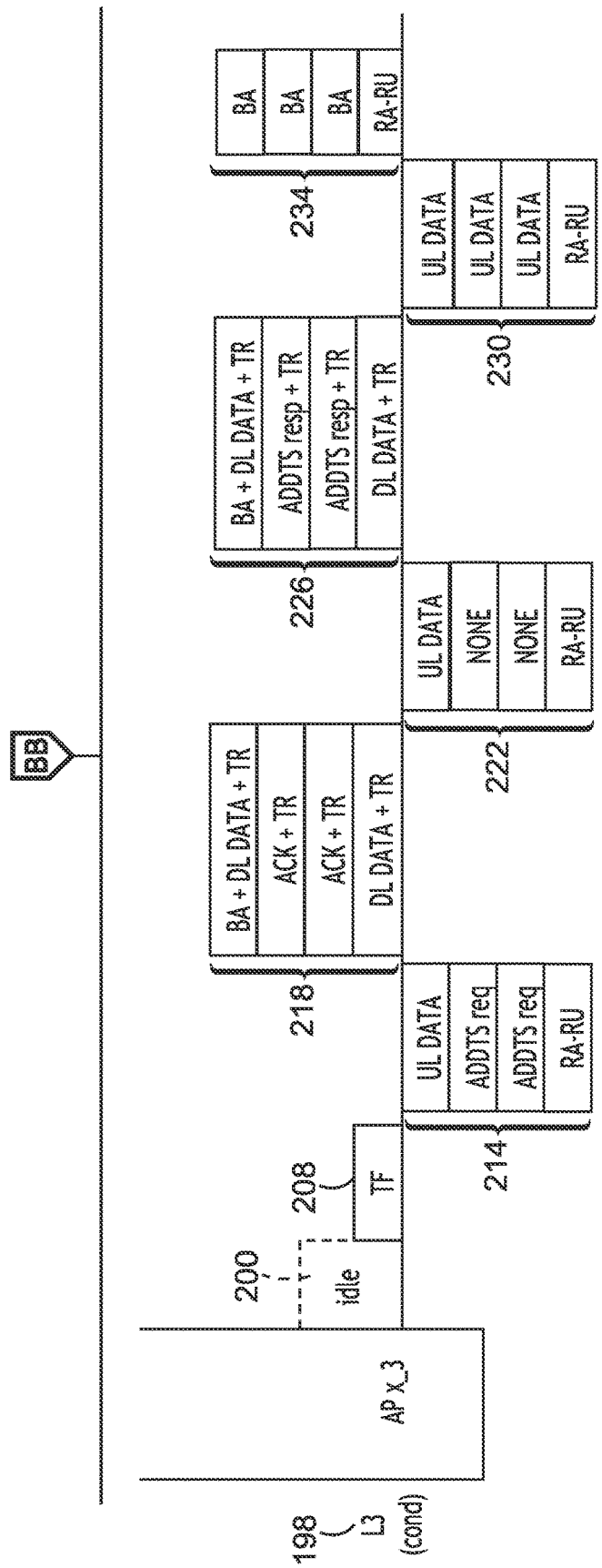

FIG. 11 and FIG. 12A through FIG. 12B illustrate an example embodiment 150, 190 of admission control. The admission control by frame exchange of the ADDTS request and ADDTS response can be executed based on a non-trigger-based TXOP for all legacy devices (only successful transmission that doesn't cause or suffer any error due to IDC interference) as seen in FIG. 11, or through trigger-based MU cascading TXOP for HE devices as seen in FIG. 12A through FIG. 12B.

Figure 15:
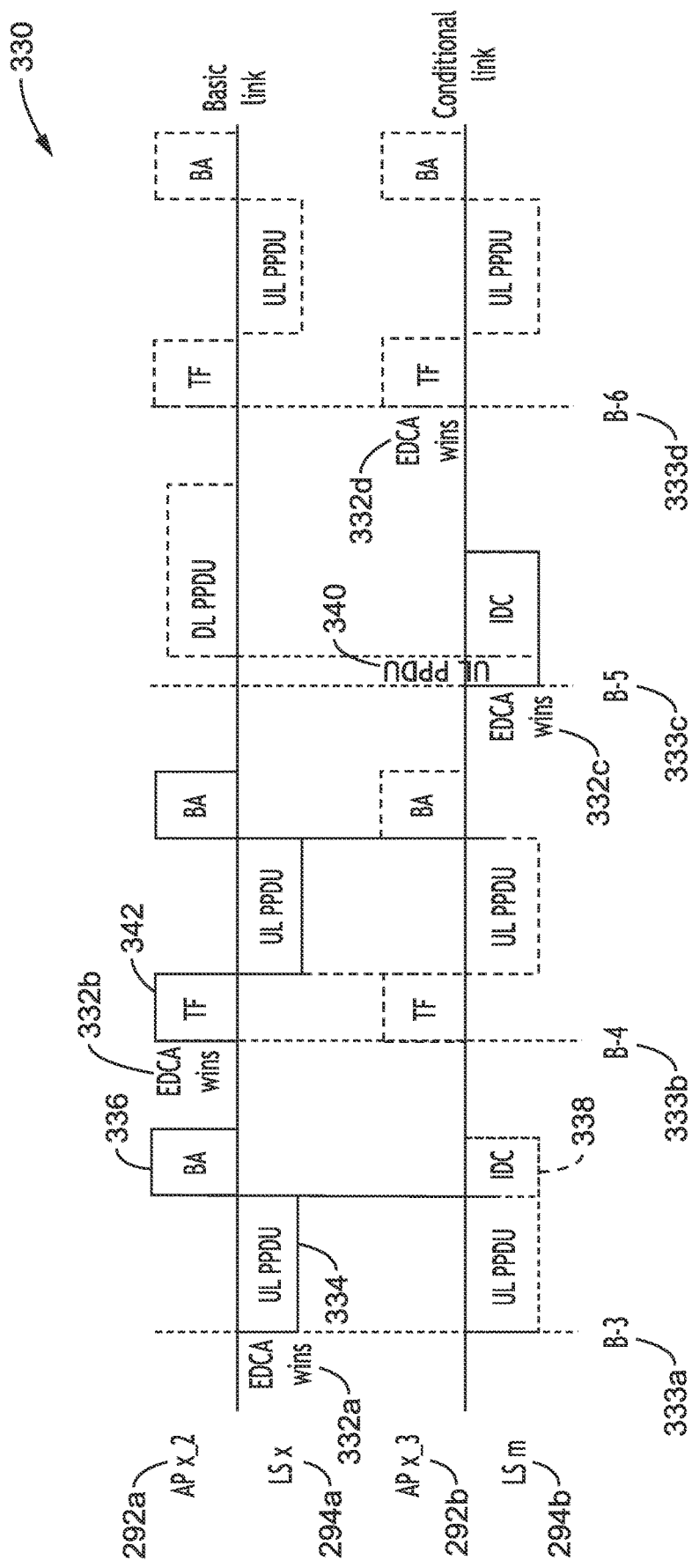
FIG. 15 is a communications diagram of another example of legacy stations LSx and LSm operating on the basic link and the conditional link according to at least one embodiment of the present disclosure.

In FIG. 11 is shown an example TS setup 150 through a non-trigger based TXOP. Interactions are shown between a soft APx_2 152 and LSx 100 on the basic link, and soft APx_3 154 and LSm 96 on the conditional link. A backoff (BO) 156 on the basic link is performed in which LSx obtains the basic link and performs an exchange of ADDTS frames with Soft AP x_2 by transmitting an ADDTS request 158 and receiving ADDTS response 162, which is processed according to B-3 to B-6 cases of example 1-2 as seen in FIG. 15. During LSx transmitting to Soft AP x_2 on basic link, data 160, seen as a UL PPDU, can optionally be transmitted from LSm to Soft AP x_3 on the other link (e.g., conditional link), which doesn't cause IDC interference on the basic link. Another ADDTS request 166, and response 170 is shown after BO 164 on the conditional link, while the basic link can be idle 168.

Figure 16:
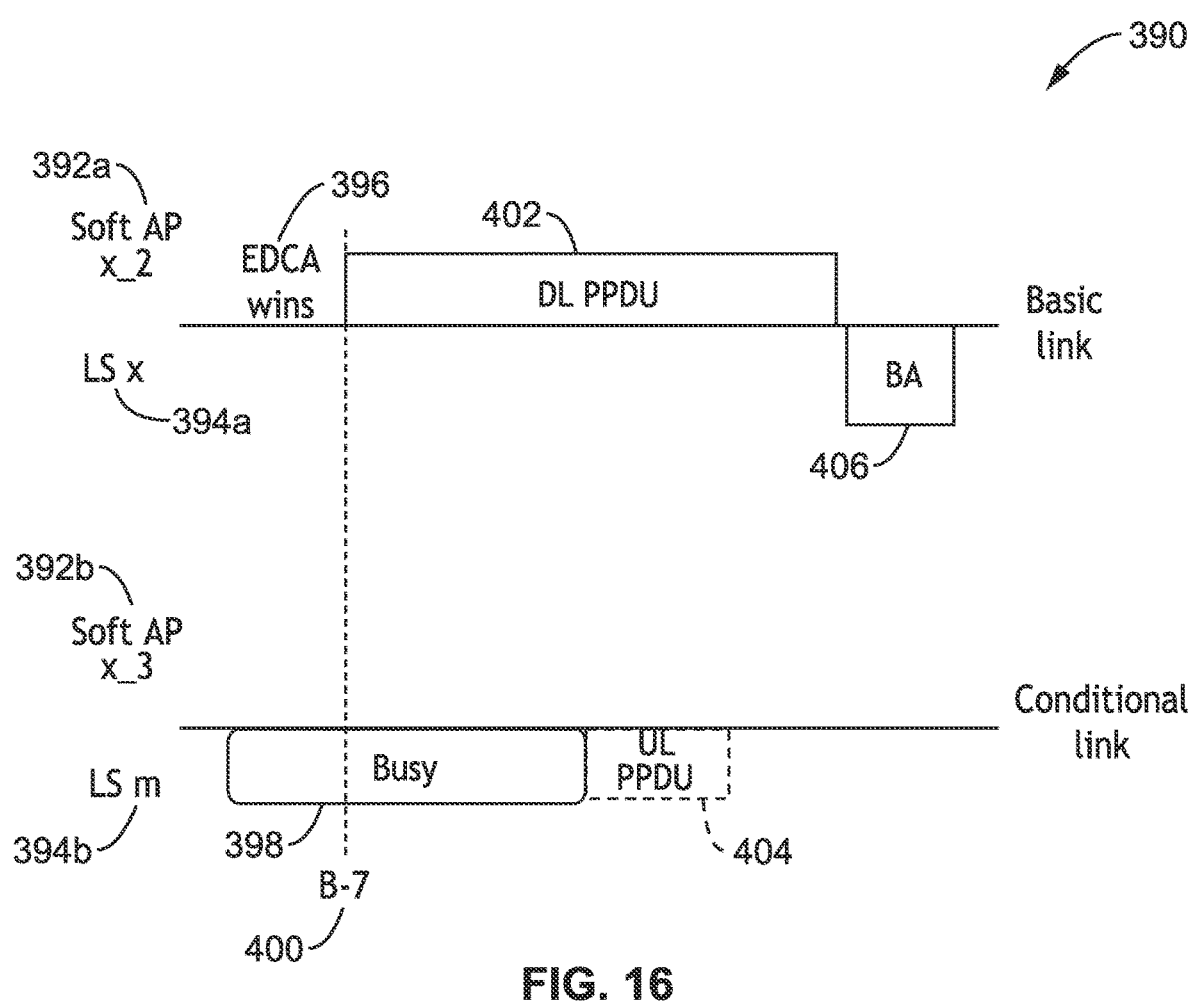
FIG. 16 is a communications diagram showing another example of operations on the basic and the conditional link according to at least one embodiment of the present disclosure.

The initial TS setup sequence of exchanging of ADDTS request and response frames is based on EDCA access, the frame exchange may not be successful as shown (e.g., B-3, B-5 and B-7 in FIG. 15 and FIG. 16)

After the initial TS setup, the exchange of ADDTS request and response frames, such as update TS setup/negotiation can use HCCA TXOPs which will not follow the processes based on cases B-3 to B-6 of example 1-2 as seen in FIG. 15 and FIG. 16.

In FIG. 12A and FIG. 12B is seen TS setup 190 through trigger-based TXOP cascading. The figure exemplifies a soft AP MLDx 192 having APx_1 associated with basic link L1 194, APx_2 associated with basic link L2 196 and APx_3 associated with conditional link L3 198. Basic link L1 is not being used in this figure.

In FIG. 12A, APx_2 on basic link L2 starts a backoff (BO) 202 while the conditional link L3 in FIG. 12B is in idle 200 status. When the BO 202 is counted down to zero, APx_2 and APx_3 simultaneously transmit Trigger Frames (TF) 206 and 208 on L2 and L3, respectively, to start the simultaneous UL/DL cascading TXOPs 204 on L2 and L3, which serve for multi-user (MU) 210 cascading sequence.

In FIG. 12A, APx_2 receives UL MU DATA 212 as responses of the TF frame 206, from some unicast RUs, along with which, Random Access RU(s) (RA-RU) may also be allocated in TF 206 for receiving UL PPDU. In this example, however, it doesn't show any STA using RA-RU 212.

In FIG. 12B, APx_3 receives UL DATA as the responses of the TF 208, from one unicast RU and two ADDTS request frames from other two unicast RUs 214. There is another RA-RU 214 reserved, which is not used by any STA on L3.

Upon receiving UL DATA or ADDTS request frame, APx_2 and APx_3 respond with acknowledgement, respectively, in the corresponding unicast RU(s), together with the BA or ACK, the APs may transmit DL DATA and/or Tigger (TR) frames in the DL cascading sequences as shown in 216, 224, 232 in FIG. 12A and 218, 226 and 234 in FIG. 12B. APx_2 and APx_3 may use the RA-RU frequency slot to transmit some DL DATA and/or TR frame in the DL cascading sequences as shown in 216 and 224 in FIG. 12A and 218 and 226 in FIG. 12B.

Upon receiving the TR on the allocated unicast RU(s), receiver STAs may respond with UL DATA in the UL cascading sequences if it has buffered DATA and finished the TS setup, as shown in 220, 228 in FIG. 12A and 222, 230 in FIG. 12B. Otherwise, the receiver may not respond (denoted as NONE) in the UL cascading sequences as shown in 222 in FIG. 12B. RA-RU is reserved for (OFDMA)-Based Random Access (UORA) in the UL cascading sequences as shown in 220, 228 in FIG. 12A and 222, 230 in FIG. 12B.

In FIG. 12B, after APx_3 responds with ACKs 218 to the ADDTS request frame 214 on the unicast RU(s), it also responds with ADDTS response frame 226 using that RU(s), together with which, APx_3 may transmit DL DATA and/or Trigger (TR) frames in the DL cascading sequences as shown in 226 in FIG. 12B.

It will be noted from the figure that TS setup is performed during TB cascade transmission. Non-AP station uses specific RU assigned by the AP to transmit ADDTS request frame and receive the ADDTS response frame. The ADDTS response frame may be transmitted in the next TXOP if it cannot be transmitted in the current TXOP. TS setup can also be executed during TB UL only transmissions. In this case, the ADDTS response frame should be aligned with the ACK/BA frames that are transmitted on other RU(s).

5.1.1. Solution 1-2: Tx and Rx between Soft AP and Non-AP MLD in EDCA TXOPs

Figure 13:
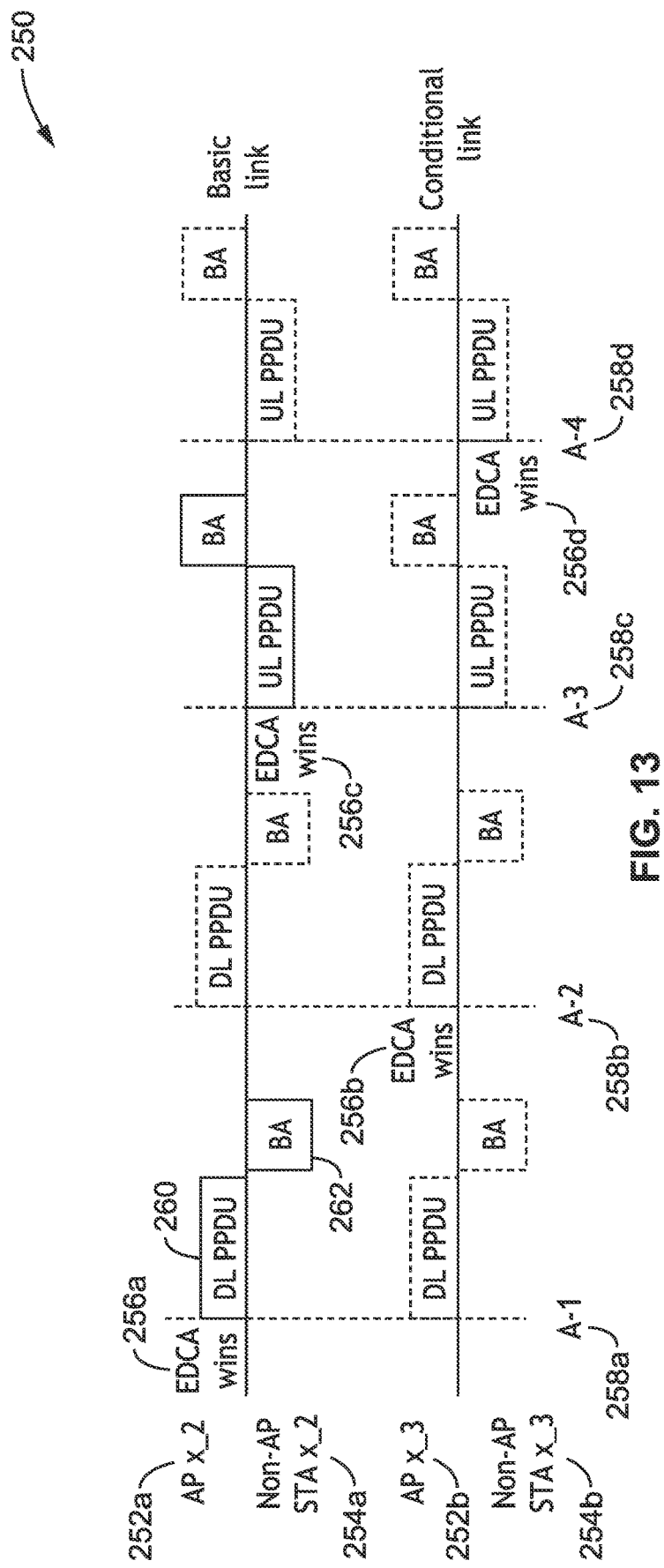
FIG. 13 is a communications diagram of a second solution showing Tx and Rx in EDCA TXOPs between the soft AP MLD and the non-AP MLD according to at least one embodiment of the present disclosure.

FIG. 13 illustrates an example embodiment 250 of a second solution showing Tx and Rx in EDCA TXOPs between a soft AP MLD and a non-AP MLD. Soft APx_2 252a and soft APx_3 252b are affiliated APs of the same soft AP MLD; while non-AP STAx_2 254a and non-AP STAx_3 254b are affiliated non-AP STAs of the same non-AP MLD.

In section A-1 258a commences after APx_2 first obtains (wins) channel access 256a on the basic link. APx_2 transmits DL PPDU 260 on the basic link, while on the conditional link if access is available, APx_3 transmits a DL PPDU synchronously with AP x_2; otherwise, it does not transmit. Then the non-AP stations simultaneously send BAs 262 on the basic link and conditional link, as the responses of receiving the DL DATA.

In section A-2 258b AP x_3 obtains 256b the conditional link. If the basic link is available, AP x_2 and AP x_3 transmit DL PPDUs simultaneously, followed by BAs; otherwise, they don't transmit and reset EDCA on the conditional link.

In section A-3 258c the non-AP STA x_2 obtains 256c the basic link, then on the basic link the non-AP STAx_2 transmits a UL PPDU; while on the conditional link if access is available then the non-AP STAx_3 transmits a UL PPDU synchronously, with BAs 262 seen as responses to receiving UL PPDU on each link. If access is not available on the conditional link, there are no transmissions on the conditional link.

In section A-4 258d the non-AP STAx_3 senses that the conditional link is idle, and it finishes BO counting in contending for the link. If the basic link is available, then non-AP STAx_2 and non-AP STAx_3 transmit UL PPDUs simultaneously, and receive BAs simultaneously. Otherwise, they don't transmit and reset EDCA on the conditional link.

It should be noted that access availability on the conditional link could be determined by PIFS sensing and whether access is available on the basic link could be determined by EDCA rules.

Figure 14:
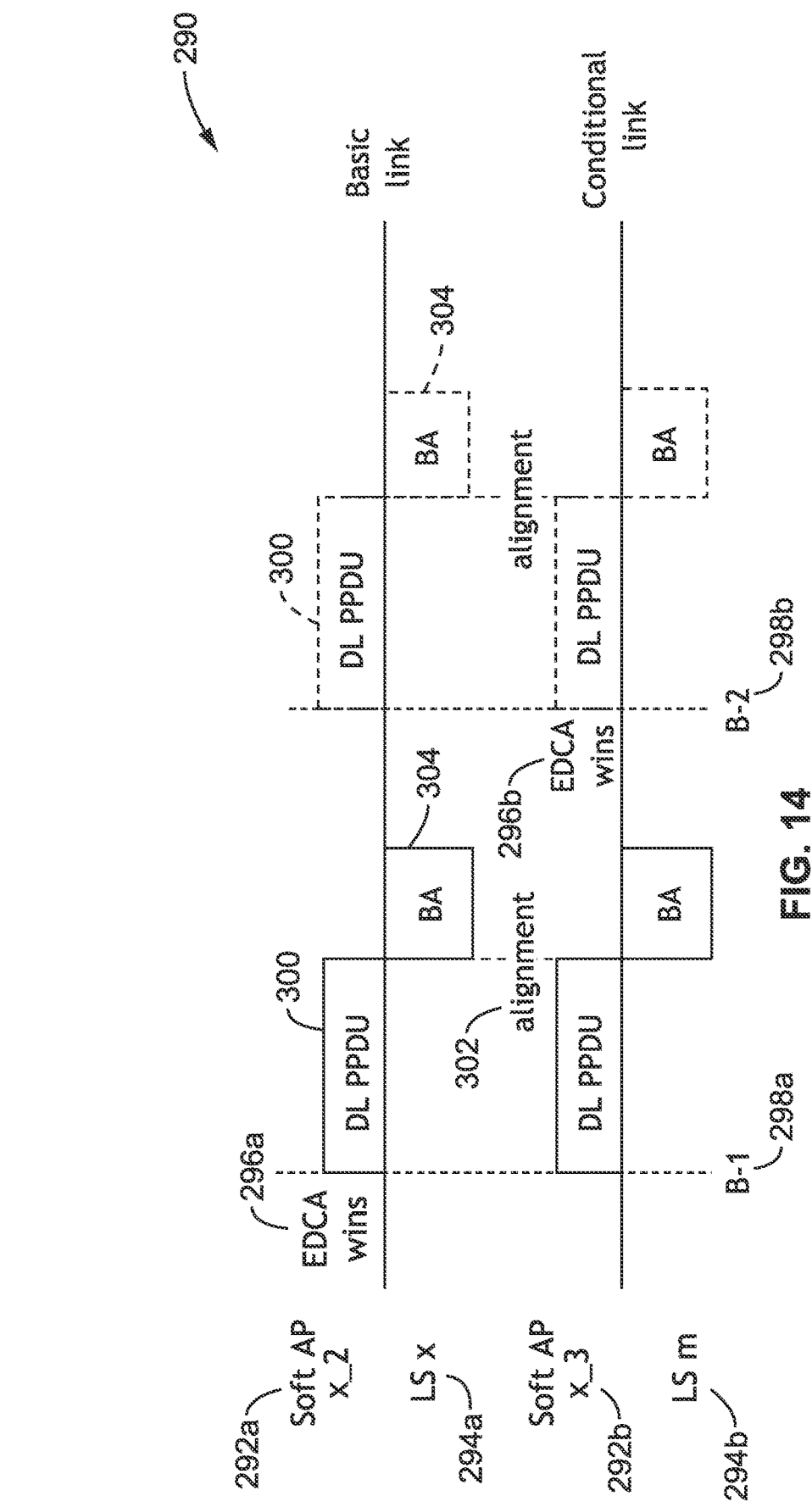
FIG. 14 is a communications diagram of legacy stations LSx and LSm operating on the basic link and the conditional link according to at least one embodiment of the present disclosure.

FIG. 14 illustrates another example embodiment 290 in which LSx 294a and LSm 294b are legacy stations operating on the basic link and conditional link, respectively, which are associated with APx_2 292a and APx_3 292b, respectively. APx_2 292a and APx_3 292b are affiliated APs of the same soft AP MLD.

APs affiliated with the soft AP MLD shall be able to detect if the received PPDU is from an EHT device or a non-EHT device (legacy device) based on the preamble of the PPDU. The Soft AP MLD can have different responses upon receiving the non-EHT PPDU as shown.

In section B-1: 298a APx_2 has obtained channel access 296a on the basic link, and transmits a DL PPDU 300; while if the conditional link is available, APx_3 synchronously transmits another DL PPDU 302 with end point aligned with the DL PPDU 300 transmitted on the basic link. Otherwise, if the conditional link is not available, then APx_3 does not transmit any DL PPDU. Upon receiving the aligned DL PPDUs on the basic link and conditional link, LSx and LSm respond with aligned BAs 304 simultaneously on the corresponding links.

In section B-2 298b APx_3 obtains 296b the conditional link access. If the basic link is available, APx_2 and APx_3 could transmit DL PPDUs 300 simultaneously (in alignment), which are followed by respective aligned BAs 304. Otherwise, if the basic link is not available, then APx_3 should not transmit and the EDCA is reset on the conditional link.

FIG. 15 illustrates another embodiment 330 showing another example of legacy stations LSx 294a and LSm 294b operating on the basic link and conditional link, respectively, which are associated with APx_2 292a and APx_3 292b, respectively. APx_2 292a and APx_3 292b are affiliated APs of the same soft AP MLD.

In section B-3 333a, LSx first obtains 332a (wins) the basic link for a non-TB UL transmission, then on the basic link LSx transmits UL PPDU 334, which may follow an RTS-CTS frame exchange with APx_2.

On the conditional link, if access is available and if APx_3 can align the frame exchange sequences of the conditional link with that on the basic link, then APx_3 should initiate a UL TB PPDU simultaneously with APx_2. Otherwise, APx_3 should not send any frame to trigger UL PPDU nor respond to any received UL PPDU.

Any UL PPDU on the conditional link that is not synchronized with that of the basic link may suffer IDC interference 338 at AP x_3 due to concurrent DL TX on basic link such as a BA 336.

In section B-4 333b APx_2 first obtains 332b the basic link for TB UL transmission and initiates TB UL TXOP. Trigger Frames (TFs) 342 followed by UL PPDU are seen sent on the basic and on the conditional link if it is available. If APx_3 is unable to use the conditional link simultaneously with APx_2, then it should not send any UL PPDU. BAs are sent in response to any UL PPDUs.

In section B-5 333c LSm obtains 332c the conditional link for UL TX, since the basic link is currently idle, LSm starts transmitting UL PPDU 340 on the conditional link. However, this UL PPDU on the conditional link will not be heard by APx_3 if APx_2 obtains the basic link and starts transmitting DL PPDU. Thus, the UL PPDU on the conditional link is shown in progress and becoming subject to IDC interference when a DL PPDU is transmitted on the basic link. The DL PPDU on the basic link might be an immediate response of the previously received frame or an urgent DL PPDU that needs to be sent immediately.

In section B-6 333d APx_3 obtains 332d the conditional link for trigger UL TX, then if the basic link is available, APx_2 and APx_3 shall initiate a trigger for triggering UL PPDUs simultaneously. Otherwise, APx_3 should not transmit anything and should reset the EDCA on the conditional link.

FIG. 16 illustrates example embodiment 390 showing another example of operations on the basic and conditional link. Legacy station LSx 394a and LSm 394b are seen operating on the basic link and conditional link, respectively, which are associated with APx_2 392a and APx_3 392b, respectively. APx_2 392a and APx_3 392b are affiliated APs of the same soft AP MLD.

In section B-7 400 APx_2 of soft AP MLDx first obtains 396 the basic link when conditional link is CCA busy 398. On the basic link APx_2 transmits DL PPDU 402, and afterward receives BA 406. On the conditional link, APx_3 cannot transmit DL PPDU because of CCA Busy 398 and cannot detect the end of CCA busy due to the interference of DL TX from the basic link. Any UL PPDU 404 from LSm on conditional link cannot be heard due to IDC interference.

It should be noted that if a soft AP MLD communicates over different links with different non-AP STAs, which may not from the same non-AP MLD, then the non-AP STAs are not aware of each other's TX/RX status, thus the channel access situations are covered by B1-B7 in the preceding figures.

FIG. 17A through FIG. 17E illustrate an example embodiment 430 of soft AP MLD communication with a Legacy Station (LS) during EDCA TXOPs.

Figure 17A:
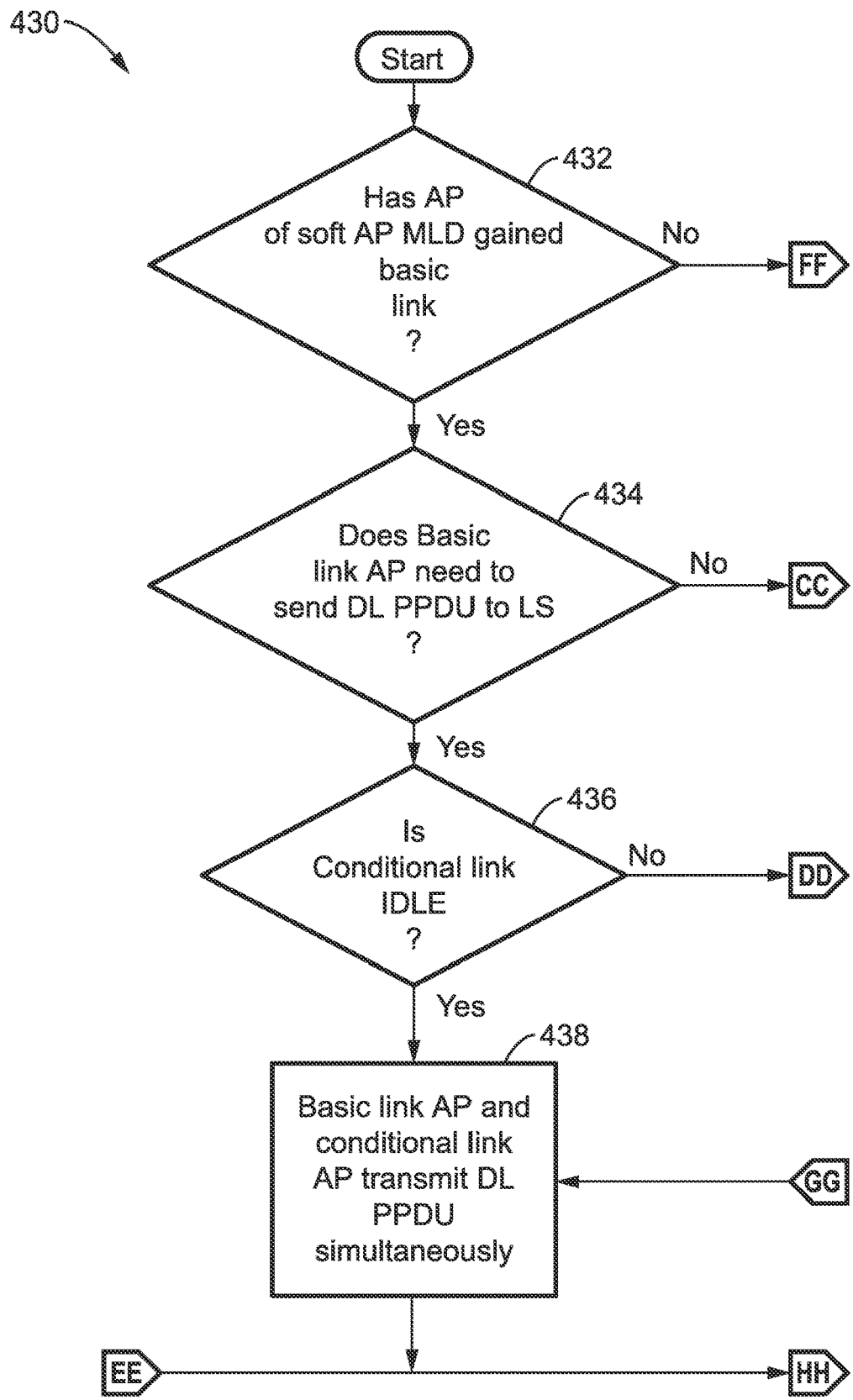
FIG. 17A through 17E is a flow diagram of the soft AP MLD communications with LS during EDCA TXOPs according to at least one embodiment of the present disclosure.

In FIG. 17A the AP of a soft AP MLD checks 432 to determine if it has obtained (gained, won) basic link channel access. If it has obtained the basic link, then at check 434 it is determined if it needs to send DL PPDU(s) to a Legacy System (LS). If it does need to send DL PPDU(s) to LS on the basic link, then at block 436 a check is made to determine if the conditional link is IDLE. If the conditional link is IDLE, then at block 438 the basic Link AP and conditional link AP of the same soft AP MLD transmit DL PPDU(s) simultaneously and keep (maintain) alignment, and the process ends in FIG. 17E.

Figure 17B:
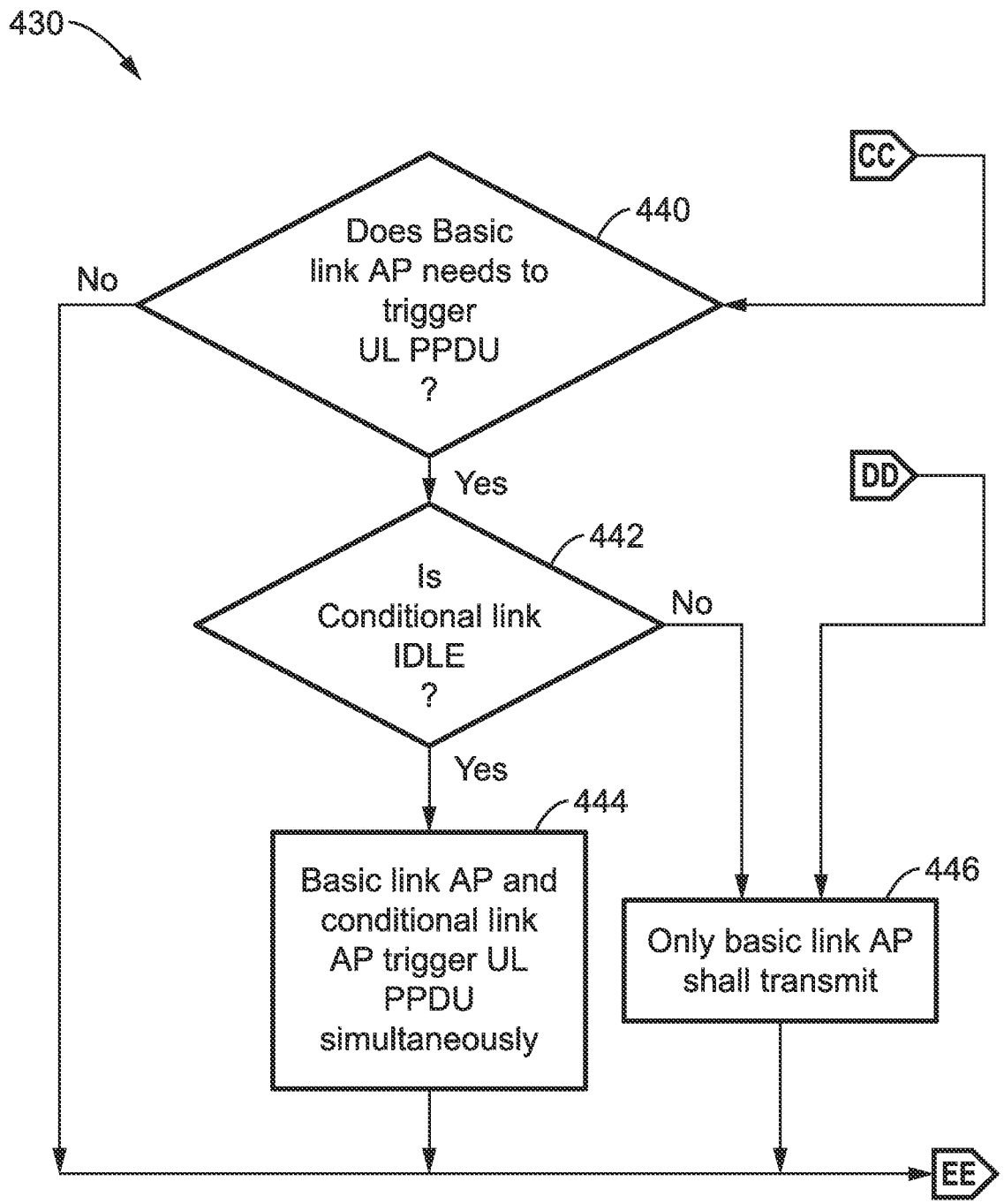
Figure 17C:
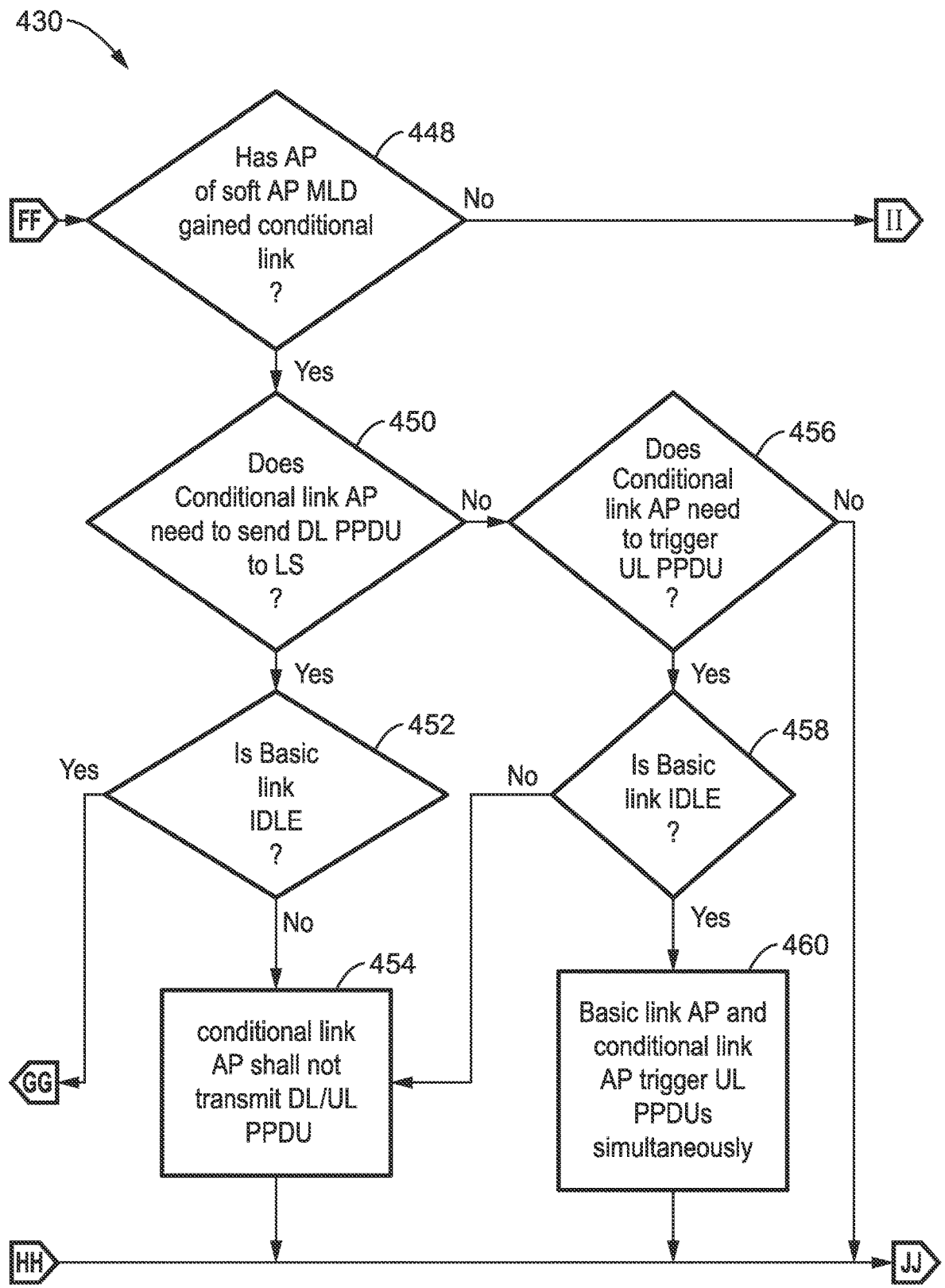

If, however, at block 432 the AP of the soft AP MLD has not obtained the basic link, then execution moves to block 448 in FIG. 17C which checks if the AP of the soft AP MLD has obtained (gained/won) the conditional link. If the conditional link is not obtained, then execution moves to block 462 in FIG. 17D which checks if a Legacy System (LS) has obtained the basic link. If not, then execution moves to block 470 in FIG. 17E which checks if the LS has obtained the conditional link. If not, then the process ends as links have not been obtained.

Returning to block 448 of FIG. 17C when the condition has been met with the AP of the soft AP MLD having obtained (gained/won) the conditional link, then execution moves to block 450 which checks if the conditional link AP needs to send a DL PPDU to a Legacy System (LS). If the condition is not met, then execution moves to block 456 which determines if the conditional link AP needs to trigger UL PPDU. If this condition is not met, then the process ends in FIG. 17E. Otherwise, the AP needs to trigger the UL PPDU(s) and execution moves to check 458 determining if the basic link is IDLE at this point. If the basic link is not idle, then execution moves to block 454 in this figure (discussed below). If the basic link is idle, then at block 460 the basic link AP and conditional link AP of the same soft AP MLD trigger UL PPDUs simultaneously, and the process ends.

Returning now to discuss block 450 in the case in which the conditional link AP needs to send a DL PPDU to an LS, and execution reaches block 452 that determines if the basic link is idle. If the basic link is idle, then execution move to block 438 in FIG. 17A in which basic link AP and conditional link AP of the same soft AP MLD simultaneous transmit DL PPDUs before the process ends. Otherwise, if the basic link is not idle as determined at block 452, then at block 454 it is determined that the conditional link AP is not allowed to transmit a DL/UL PPDU, and the process ends.

Returning now to discuss block 434 in FIG. 17A, for the case when the condition is not met of the basic link AP needing to send a DL PPDU to an LS, and execution moves to block 440 in FIG. 17B where a check is made to determine if the basic link AP needs to trigger a UL PPDU. If the condition is not met, then execution ends in FIG. 17E. Otherwise, block 442 is reached which determines if the conditional link is IDLE. If the conditional link is not idle, then at block 446 it is decided (determined) that only the basic link AP shall perform transmission and execution ends. If, however, at block 442, the conditional link is idle, then at block 444 the basic link AP and conditional link AP both transmit UL PPDU simultaneously before this process ends.

Returning to block 436 in FIG. 17A in the case that the conditional link is not idle, then execution reaches block 446 in FIG. 17B in which it is determined that only the basic link AP shall perform transmission and this process ends.

Figure 17D:
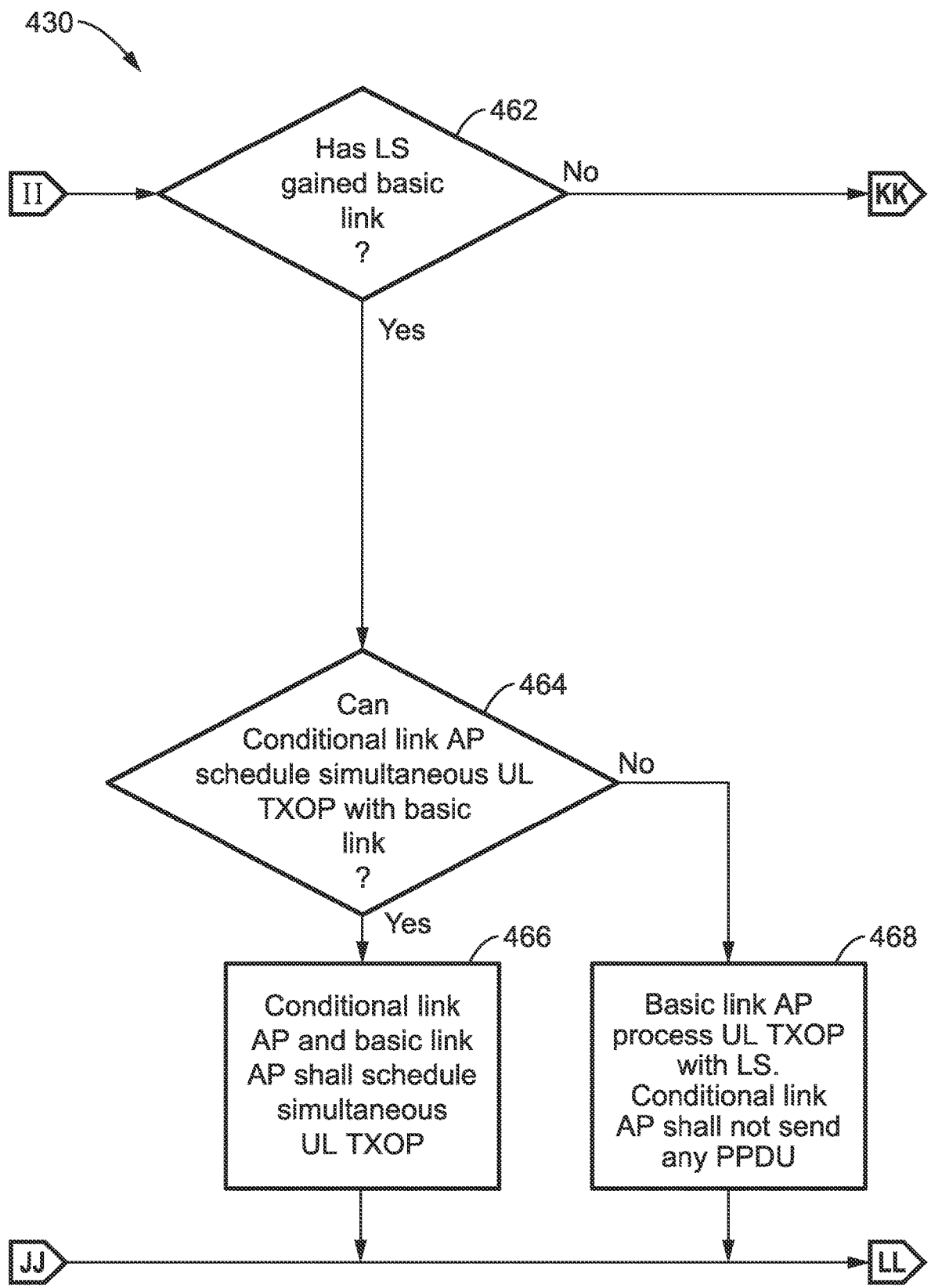

Returning now to block 462 in FIG. 17D for the case when the LS has obtained the basic link and execution moves to block 464 which checks if the conditional link AP can schedule a simultaneous UL TXOP with the basic link. If the condition is met, then at block 466 the conditional link AP and basic link AP schedule simultaneous UL TXOPs and this process ends. Otherwise, if the condition is not met, then at block 468 the basic link AP performs a UL TXOP with the LS, but the conditional link AP shall not send any PPDU, and the process ends.

Figure 17E:
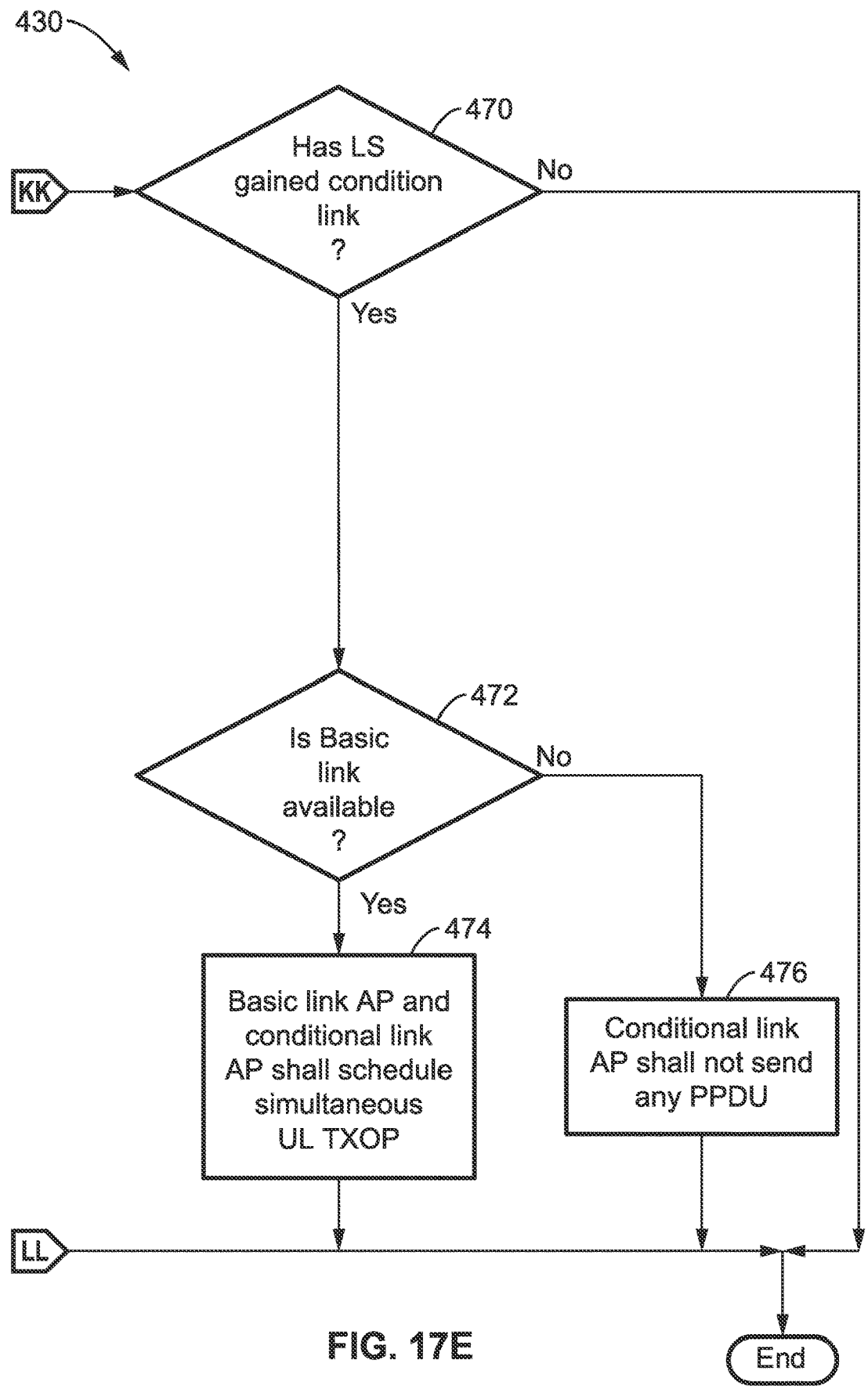

Returning now to block 470 in FIG. 17E in the case that the LS has obtained the conditional link, with execution reaching block 472 determining if the basic link is available. If the basic link is available, then at block 474 the basic link AP and the conditional link AP schedule transmission of simultaneous UL TXOP, after which the process ends. Otherwise, since the basic link is not available, then at block 476 the conditional link AP is not allowed to send any PPDU, and the process ends.

5.2. Simultaneous UL/DL HCCA TXOP

Simultaneous scheduled UL/DL TXOP may apply to: (a) legacy STAs, (b) affiliated stations of (same or different) non-AP MLD and (c) affiliated stations of a non-AP MLD and legacy STA on either a basic link or a conditional link.

Figure 18:
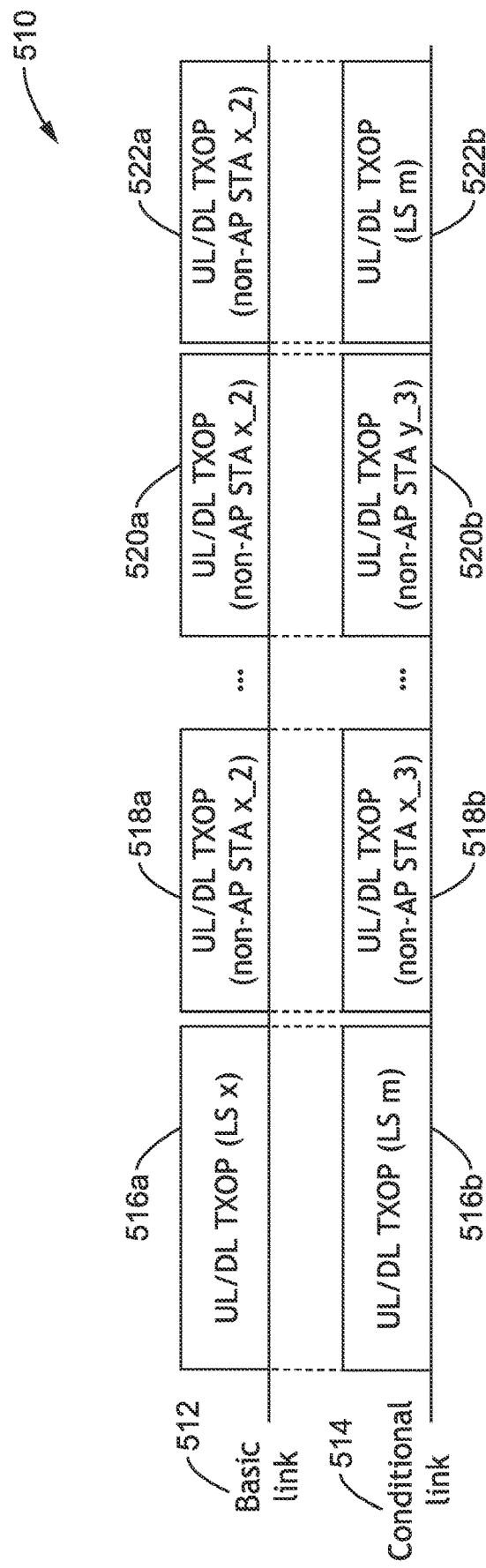
FIG. 18 is a communications diagram of simultaneous scheduled UL/DL TXOP according to at least one embodiment of the present disclosure.

FIG. 18 illustrates an example embodiment 510 of simultaneous scheduled UL/DL TXOP. Both APs affiliated with the same soft AP MLD obtain basic link 512 and conditional link 514 simultaneously if both links are idle at the TxPIFS slot boundary. All stations obey the NAV rules of the HCF, and each frame transmitted under HCF contains a NAV duration value.

If the APs have no more STAs to poll and have no more Data, Management, Block Ack Request or Block Ack frames to send, they may reset the NAVs of all QoS STAs in the BSS by sending a QoS CF-Poll frame with the RA matching its own MAC address and with the Duration/ID field set to 0.

When a STA receives a frame addressed to it and requires an acknowledgement, it shall respond with an Ack or QoS+CF-ACK frame regardless of its NAV. A non-AP STA shall accept a polled TXOP by initiating a frame exchange sequence regardless of its NAV.

For the UL TXOP in FIG. 18, the affiliated APs of the soft AP MLD simultaneously poll non-AP stations that are operating on the basic link and conditional link by allocating the same polled TXOP duration. The polled TXOP durations 516a, 516b, 518a, 518b, 520a, 520b, 522a, 522b on the basic link and the conditional link are scheduled according to the traffic conditions of the polled stations.

The polled non-AP station (which is a non-AP QoS STA that has its own address matches the address 1 field of the received QoS CF-Poll frame) shall not exceed the polled TXOP duration and may use any type of padding or frame aggregation to maintain PPDU end time alignment on the basic link and the conditional link.

If the polled non-AP station only uses a portion of the allocated TXOP, the receiver AP shall not poll until the polled TXOP on the other link is completed. The affiliated APs of the soft AP MLD shall poll simultaneously. The polled non-AP station may transmit multiple frame exchange sequences within a given polled TXOP, subject to the limit on TXOP duration.

For the DL TXOP in FIG. 18, the affiliated APs of the soft AP MLD shall simultaneously send DL PPDU(s) to non-AP stations that are operating on each link by allocating the same HCCA TXOP duration. The affiliated APs of the soft AP MLD may transmit multiple frame exchange sequences within given polled TXOP, subject to the limit on TXOP duration. The affiliated APs of the soft AP MLD may use any type of padding to align the end time of transmitted PPDUs.

Figure 19:
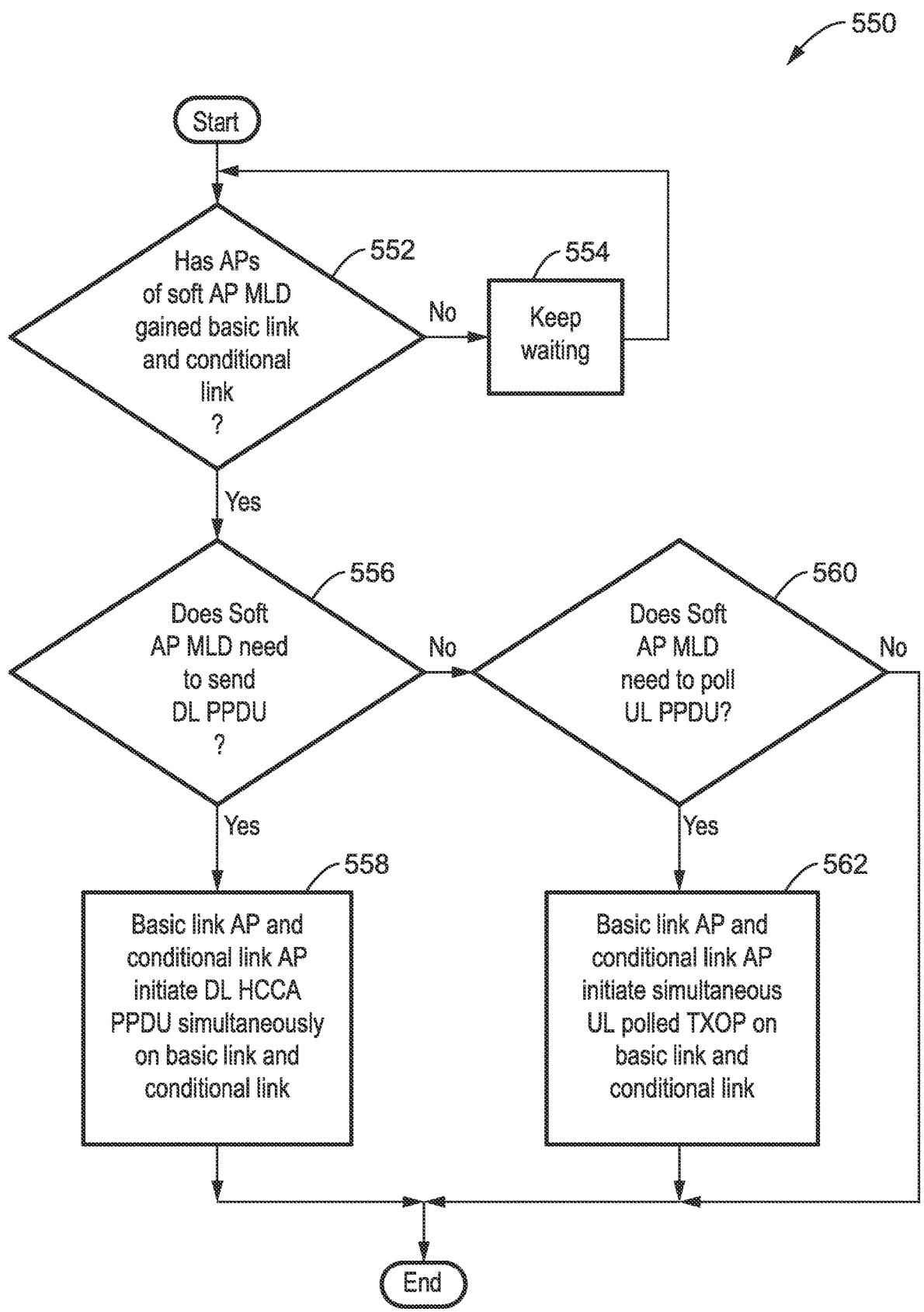
FIG. 19 is a flow diagram of cooperative scheduling on the basic Link and conditional link with duration HCCA TXOP according to at least one embodiment of the present disclosure.

5.2.1. Cooperative Schedule on Basic Link and Conditional Link Duration HCCA TXOP FIG. 19 illustrates an example embodiment 550 of cooperative scheduling.

In block 552 a check determines if the APs of the same soft AP MLD have obtained (gained, won) the basic link and conditional link. If the condition is not met, then a wait occurs 554 before the check is repeated (within limitations). If the condition is met, then at block 556 a check determines if the soft AP MLD needs to send a DL PPDU. If the condition is met, then at block 558 the basic link AP and conditional link AP initiate a DL HCCA PPDU simultaneously on the basic link and the conditional link and the process ends. Otherwise, if the condition at block 556 is not met, then block 560 checks if the soft AP MLD needs to poll the UL PPDU. If polling is not necessary, then the process ends. Otherwise, at block 562 the basic link AP and conditional link AP initiates simultaneous UL polled TXOP on the basic link and conditional link and the process ends.

5.3. Example 1-3-1 Recovery from Absence of Expect Reception

Figure 20:
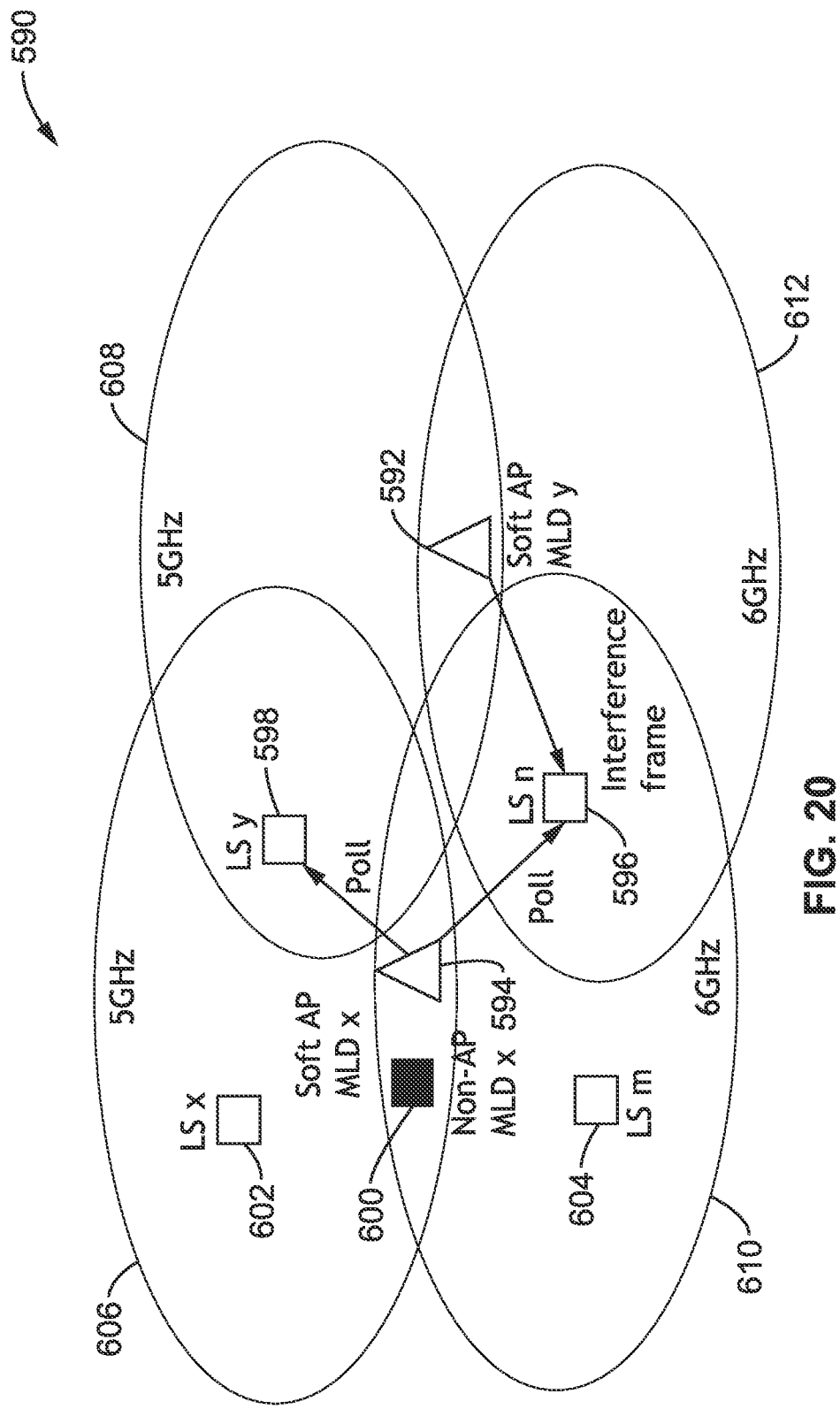
FIG. 20 is a topology diagram of an example 1-3-1 for the problem of recovery from the absence of expected reception in a hidden terminal situation according to at least one embodiment of the present disclosure.

FIG. 20 illustrates a topology 590 for an example 1-3-1 on the problem of recovery from the absence of expected reception in a hidden terminal situation. It should be noted that the separation of the 5 GHz and 6 GHz in the figure only represent frequency band separation not spatial separation. In the figure is shown a soft AP MLDy 592 operating in both 5 GHz 608 and 6 GHz 612, with the affiliated APs, e.g., soft APy_2 and soft APy_3, respectively; a soft AP MLDx 594 operating in both 5 GHz 606 and 6 GHz 610, with the affiliated APs, e.g., soft APx_2 and soft APx_3, respectively; the soft APy_2, soft APy_3, soft APx_2 and soft APx_3 are not shown in the figure. A non-AP MLDx 600 operating in both 5 GHz 606 and 6 GHz 610 links, using the affiliated non-AP STAs, e.g., non-AP STA x_2 and non-AP STAx_3, respectively. Non-AP STA x_2 and non-AP STAx_3 are not shown in the figure.

A legacy station LSx 602 and a legacy station LSy 598 are associated with one of the affiliated APs of the soft AP MLDx 594 that is operating on 5 GHz. A legacy station LSm 604 and a legacy station LSn 596 are associated with one of the affiliated APs of the soft AP MLDx 594 that is operating on 6 GHz. LSy and LSn are located in the coverage range of the affiliated APs of the soft AP MLDy, on 5 GHz and 6 GHz, respectively.

This figure shows an example in which a collision of a QoS CF-Poll frame and another management frame occurs in a hidden terminal scenario. It is assumed that soft APx_3 of soft AP MLDx and soft APy_3 of soft AP MLDy are operating on the 6 GHz channel and cannot hear each other. A collision is shown arising when soft APx_3 and soft APy_3 simultaneously send frames to/arrive at LSn 596. It should be noted that the interference frame may not be sent to LSn, with the arrows indicating frames that can be heard by a specific station instead of being addressed to a specific station.

Figure 21:
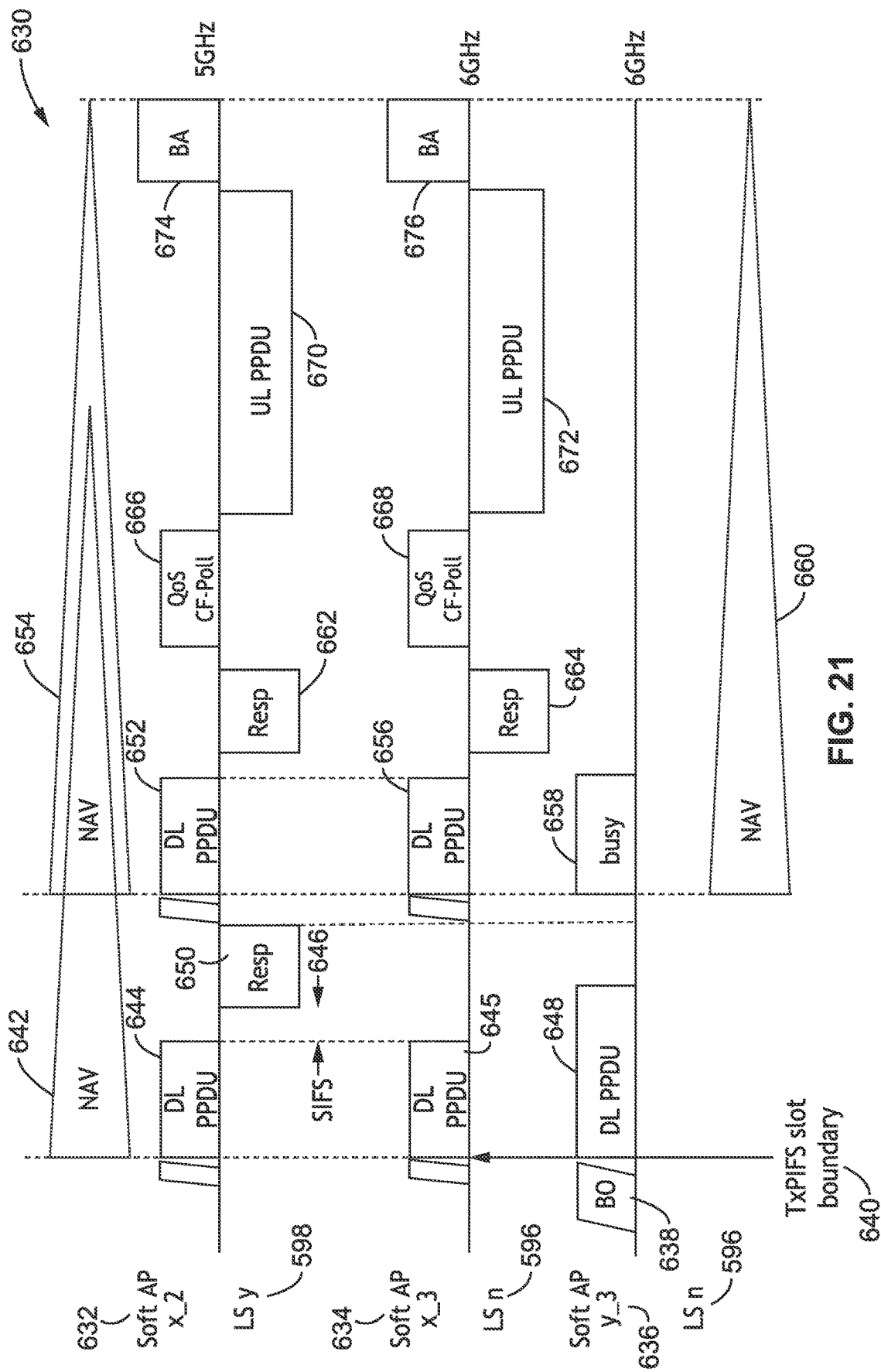
FIG. 21 is a communications diagram of example 1-3-1 showing a solution embodiment to the collision issue caused by a hidden AP according to at least one embodiment of the present disclosure.

FIG. 21 illustrates 630 example 1-3-1 showing a solution embodiment to the collision issue caused by a hidden AP issue of FIG. 20. The figure depicts interactions between a soft APx_2 632 and LSy 598, soft APx_3 634 and LSn 596 and soft APy_3 636 and LSn 596. It should be appreciated that LSn is shown in the communication interactions on two lines in the figure, since it is involved in the communication between hidden terminals, with one of the hidden terminals communicating with LSn and with the other one interfering LSn.

To resolve the collision issue caused by a hidden AP sending a management frame on one link (e.g., 6 GHz link), in at least one embodiment of the present disclosure a very small (compact) DL PPDU, that carries no DATA payload, is sent instead of immediately sending a QoS CF-Poll at the beginning of the TXOP, since the recovery/retransmission time on one link may be affected by the polled UL PPDU size on the other link.

In the figure, soft APy_3 is performing backoff 638, and soft APx_2 and soft APx_3 similarly contend for channel access. Soft APy_3 finishes backoff count down and soft APx_2 and soft APx_3 sense channel idle at the TxPIFs boundary 640, then each of the three obtain their respective links at the same time.

In solution to this 1-3-1 issue an element (a) is performed in which both APs affiliated with the soft AP MLDx are seen sending a very small (compact) DL PPDU frame 644 and 645 (e.g., RTS, null, control or management frames) on the basic link and conditional link simultaneously if both links are idle at the TxPIFS slot boundary, in response to starting the DL PPDU transmissions NAV 642 is seen to protect the duration of the TXOP. However soft APy_3 sends a full DL PPDU 648 at this same time.

Conditions on element (a) include (a)(i) in which if any AP station cannot receive the CTS/ACK/BA as a response 650 of the DL PPDU after SIFS 646, it indicates that there may be a collision. A retransmission process should repeat (a) this short DL PPDU transmission. Thus, soft APx_2 and soft APx_3 are seen obtaining the channel again and sending short DL PPDUs 652 and 656, NAV 654 and 660 commencing, and soft APy_3 being seen as busy 658.

(a)(ii) If both AP stations receive the CTS/ACK/BA as a response 662 and 664 of the DL PPDU after SIFS, they shall poll 666 and 668 UL TXOP or send DL TXOP simultaneously on basic link and conditional link with an updated NAV duration 654.

(a)(iii) Both APs affiliated with the soft AP MLDx may limit the retransmission times of the small DL PPDU frames over both links (in case the Soft APy_3 sends a very long DL PPDU). When the retransmission meets the retransmission limitations, the AP receives the CTS/ACK/BA as the response of the DL PPDU after SIFS and should poll UL TXOP or send DL TXOP independently. The AP doesn't receive the CTS/ACK/BA as the response of the DL PPDU should not poll UL TXOP nor send DL TXOP.

After the CF polling, LSy and LSn are seen sending UL PPDU 670 and 672 to the soft AP MLD from which it receives BAs 674 and 676.

Figure 22:
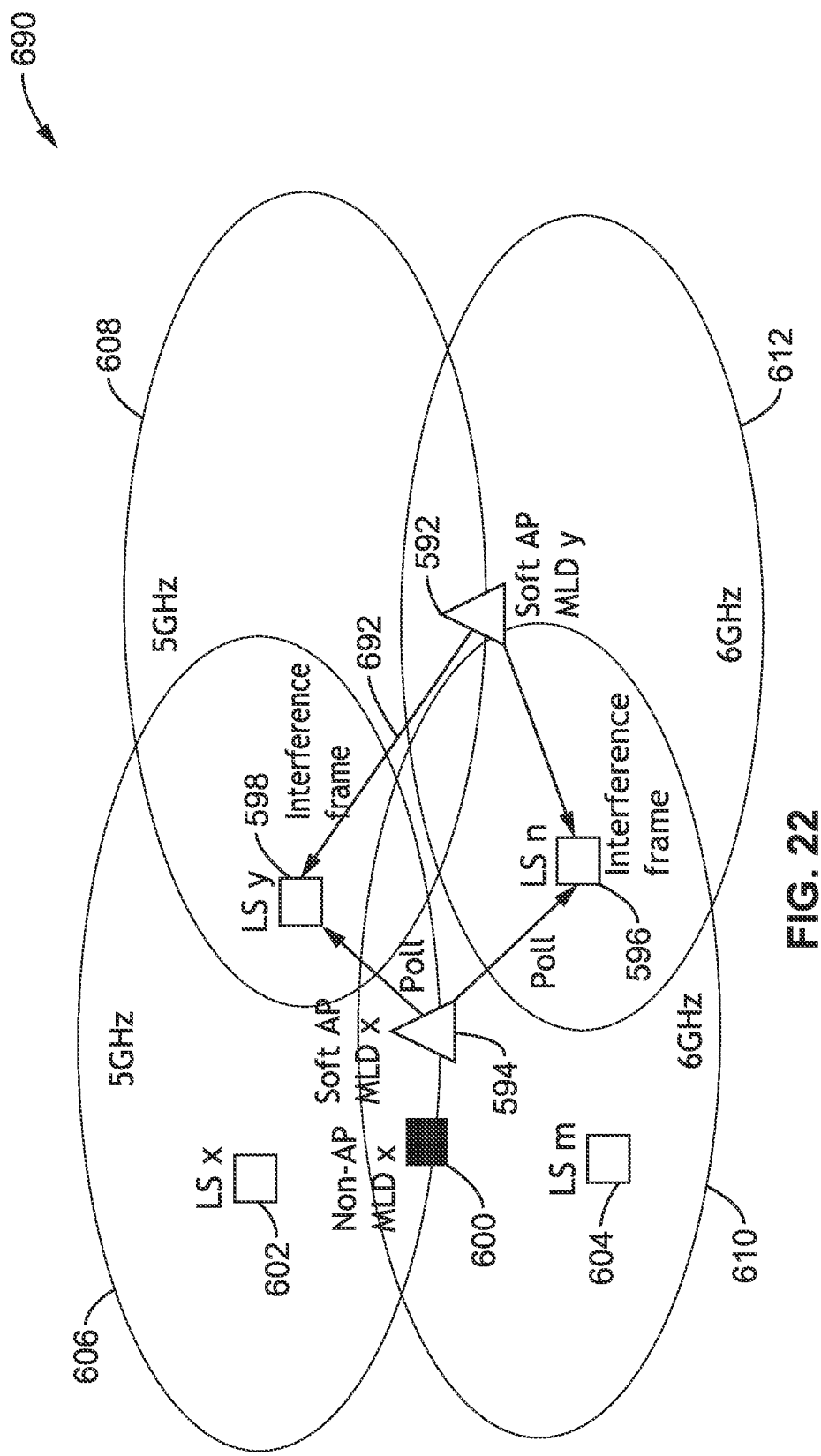
FIG. 22 is a topology diagram for an example 1-3-2 on the problem of recovery from the absence of expected reception in a hidden terminal in CFP situation according to at least one embodiment of the present disclosure.

FIG. 22 illustrates an example topology 690 for example 1-3-2 on the problem of recovery from the absence of expected reception in a hidden terminal in CFP situation, in which a collision arises between QoS CF-poll frames using HCCA. This figure is a variation of FIG. 20 and also shows soft AP MLDy 592 operating in both 5 GHz 608 and 6 GHz 612, with the affiliated APs, e.g., soft APy_2 and soft APy_3, respectively; a soft AP MLDx 594 operating in both 5 GHz 606 and 6 GHz 610, with the affiliated APs, e.g., soft APx_2 and soft APx_3, respectively; the soft APy_2, soft APy_3, soft APx_2 and soft APx_3 are not shown in the figure. A non-AP MLDx 600 operating in both 5 GHz 606 and 6 GHz 610 links, using the affiliated non-AP STAs, e.g., non-AP STAx_2 and non-AP STAx_3, respectively. Non-AP STAx_2 and non-AP STAx_3 are not shown in the figure.

A legacy station LSx 602 and a legacy station LSy 598 are associated with one of the affiliated APs of the soft AP MLDx 594 that is operating on 5 GHz. A legacy station LSm 604 and a legacy station LSn 596 are associated with one of the affiliated APs of the soft AP MLDx 594 that is operating on 6 GHz. LSy and LSn are located in the coverage range of the affiliated APs of the soft AP MLDy, on 5 GHz and 6 GHz links, respectively.

This figure shows an example of a collision of QoS CF-Poll frames because of a hidden terminal problem. Soft AP MLDx and soft AP MLDy are operating on 5 GHz and 6 GHz links and cannot hear each other. A Collision arises when the affiliated APs of the soft APx and the affiliated APs of the soft APy simultaneously send QoS CF-Poll frames to LSn on the 6 GHz link and LSy on the 5 GHz link.

Figure 23:
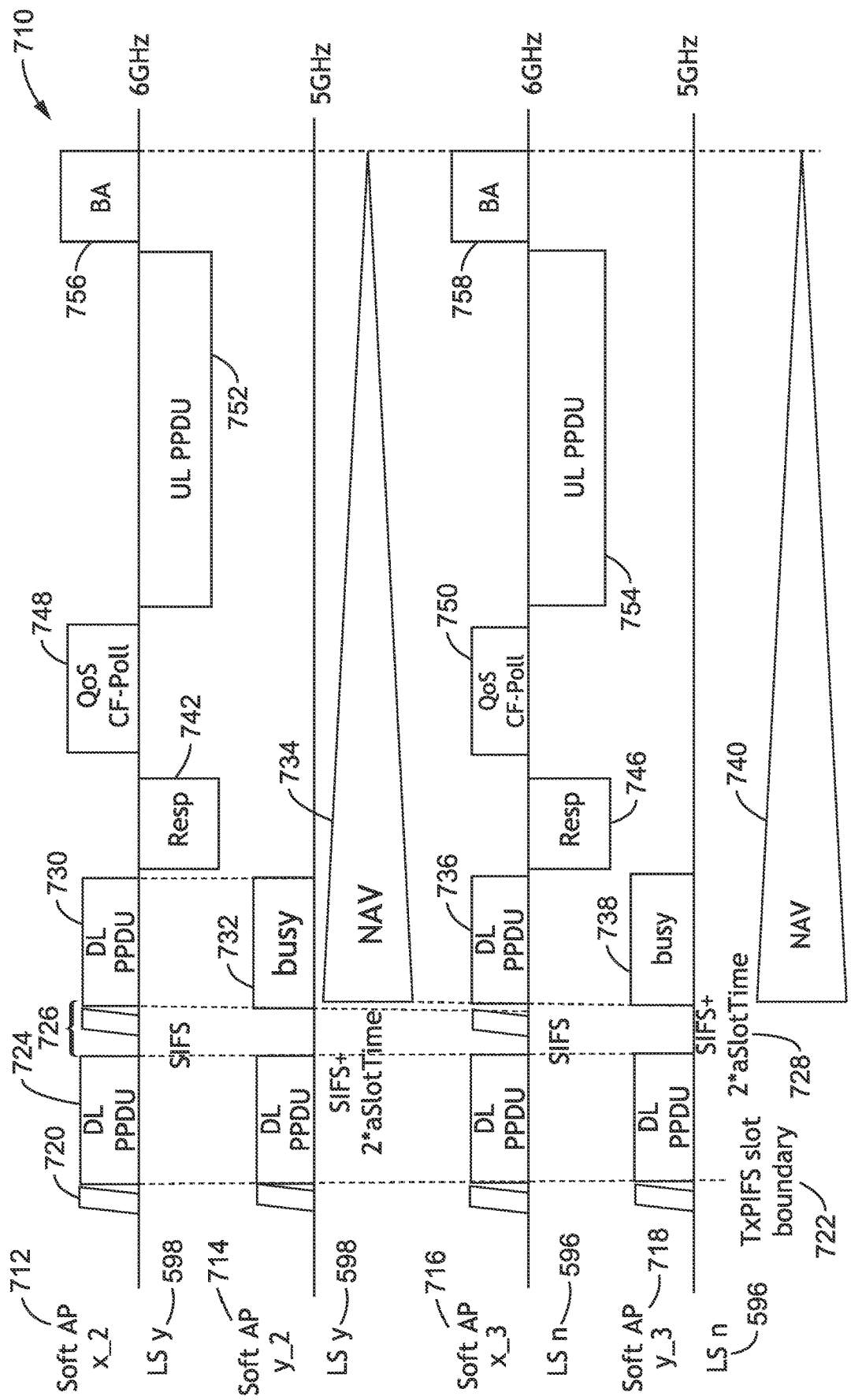
FIG. 23 is a communication diagram for example 1-3-2 showing a recovery scheme embodiment to the collision issue caused by a hidden terminal in CFP when initiating HCCA TXOP according to at least one embodiment of the present disclosure.

FIG. 23 illustrates 710 example 1-3-2 showing a recovery scheme embodiment to the collision issue caused by a hidden terminal in CFP when initiating HCCA TXOP. The figure depicts interactions between a soft APx_2 712 and LSy 598, soft APy_2 714 and LSy 598, soft APx_3 716 and LSn 596, and soft APy_3 718 and LSn 596.

To resolve the collision issue caused by a hidden terminal sending QoS CF-Poll frame following HCCA policy. This is the same as seen for example 1-3-1 of FIG. 21 as described in element (a) therein.

(a)(i) If any AP station cannot receive the CTS/ACK/BA as a response of the DL PPDU after SIFS, it indicates that there may be a collision. However, if it directly processes step (a), then subsequent collisions may occur. To avoid subsequent collisions, simultaneous recovery and/or retransmission of each soft AP MLD may start after aSIFSTime+n*aSlotTime, where n is a random variable.

(a)(ii) This is the same process as described for (a)(ii) for example 1-3-1.

In the figure is shown the soft APs obtaining 720 the link at the TxPIFs slot boundary 722 and each sending a DL PPDU 724. Since these soft APs don't receive any response of the DL PPDU, they re-contend for channel access. Soft APx_2 and soft APx_3 re-contend for the channel after a SIFS time; soft APy_2 and soft APy_3 re-contend for the channel after a SIFS+2*SlotTime. Then after SIFS, soft APx_2 and soft APx_3 are seen obtaining the channel again and sending short DL PPDUs 730 and 736, NAV 734 and 740 commencing, and soft APy_2 and 3APy_3 being seen as busy 732 and 738. If both APx_2 and APx_3 stations receive the CTS/ACK/BA as a response 742 and 746 of the DL PPDU after SIFS, they poll 748 and 750 UL TXOP. UL PPDU 752 and 754 are seen being received after which APs respond with associated BA 756 and 758.

Figure 24:
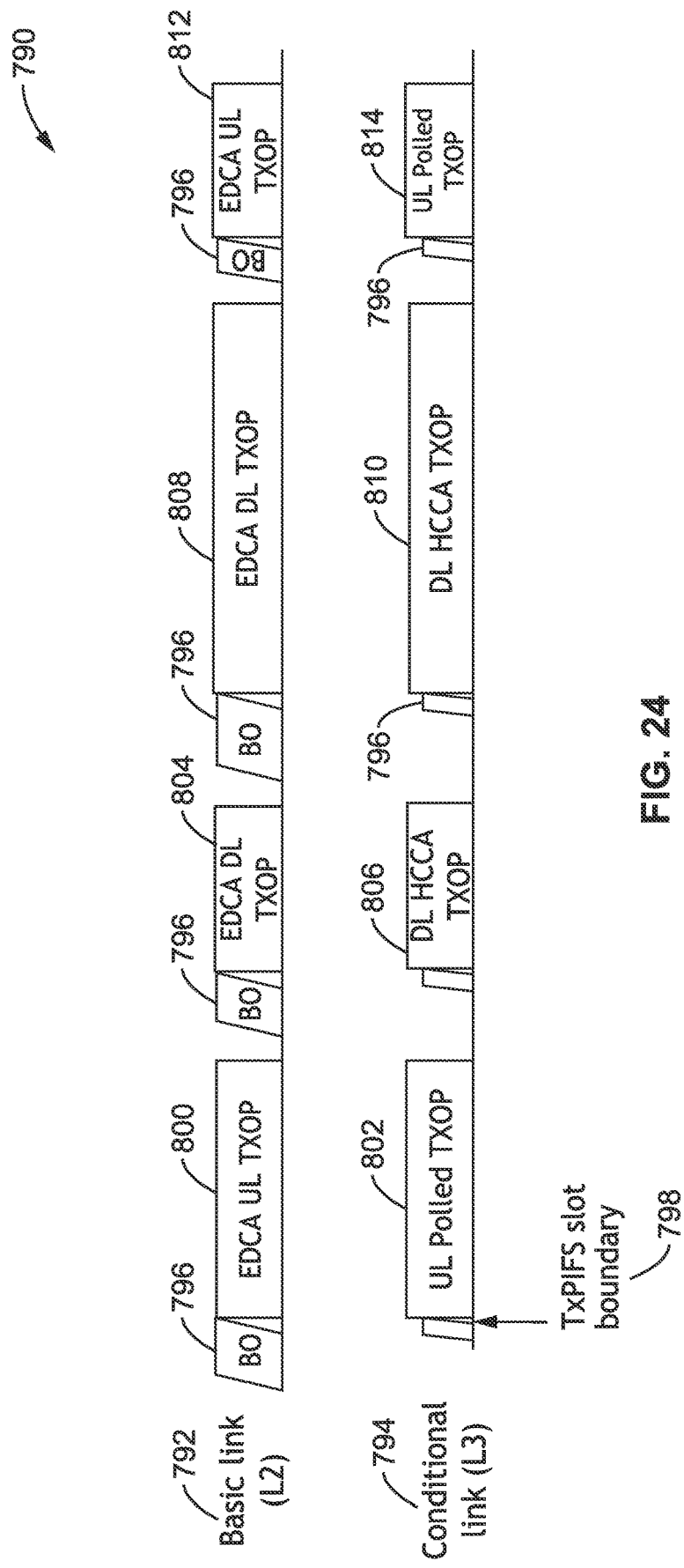
FIG. 24 is a communications diagram of adaptive polling-based scheduling on the conditional link based on the basic link status according to at least one embodiment of the present disclosure.

5.3.1. Solution 2: Adaptive Polling-Based Scheduling on Conditional Link According to Basic Link Status FIG. 24 illustrates an example embodiment 790 of adaptive polling-based scheduling on the conditional link based on the basic link status.

Stations operating on the basic link access the channel utilizing EDCA policy. Legacy (non-EHT) devices access the conditional link based on the HCCA policy. EHT devices may access the conditional link through EDCA or HEMM, which is HCCA, EDCA mixed mode. All stations obey the NAV rules of the HCF.

The affiliated APs of a soft AP MLD are aware of UL/DL transmissions on the basic link since they have the same Station Management Entity (SME). The AP of the soft AP MLD for conditional link shall schedule the UL/DL transmission on the conditional link according to the concurrent UL/DL transmission on the basic link.

The AP of the soft AP MLD on the conditional link may negotiate with non-AP legacy STAs to agree on a large maximum Service Interval (SI) value during admission control. An AP of the soft AP MLD may use the maximum SI of an admitted Traffic Stream (TS) for the scheduling in case it cannot service the TS at the scheduled timing, due to the simultaneous transmission and reception over the basic link and conditional link or the interference on the conditional link. If the next service start time meets the admitted maximum SI value on the conditional link, but there are one or more HCCA TXOP schedules on the conditional link that will lead to asynchronized UL/DL transmissions with concurrent basic link transmission, then the AP of the soft AP MLD on the conditional link should not service the TS.

The AP of the soft AP MLD grants a STA a polled TXOP with a duration specified in a QoS (+)CF-Poll frame. One or multiple frame exchanges may occur in the polled TXOP, the start time and end time of the frame exchange sequence on the basic link and conditional link shall be aligned.

FIG. 24 illustrates an example embodiment 790 of STAs operating on the basic link 792 accessing the channel based on EDCA policy, with legacy (non-EHT) devices accessing the conditional link 794 utilizing the HCCA policy. A BO 796 is seen on the basic link, and when the BO counts down to zero, the conditional link is sensed as idle at TxPIFs boundary 798. Thus, an EDCA UL TXOP 800 commences on basic link, while a simultaneous UL polled TXOP 802 is performed on the conditional link. Similar examples are seen EDCA DL TXOP 804 on the basic link with a simultaneous DL HCCA TXOP 806 on the conditional link. Also, after BO, an EDCA DL TXOP 808 commences on the basic link with a simultaneous DL HCCA TXOP 810 on the conditional link. Then, after a BO, an EDCA UL TXOP 812 commences on the basic link with a simultaneous UL Polled TXOP 814 on the conditional link.

5.4. Admission Control: Condition Link for Poll-Based Access Only

For this solution, the access limitation shall only apply to the devices operating on the conditional link. So, the following things are true about the conditional link. Beacon frames shall set (specify) ACM (Admission Control Mandatory)=to a first state (e.g., "1") meaning true for all ACs. The TS setup process shall be executed as described in example 1-1. The AP can distinguish EHT PPDU and non-EHT PPDU when receiving an ADDTS request during admission control, such as from header information.

The following applies during admission control. If an ADDTS request is received from a non-EHT device (legacy device), then the soft AP on the conditional link shall specify the channel access policy as HCCA by sending an ADDTS response frame to the legacy devices and setting the Access Policy subfield in the TSPEC element indicating that the admitted TS is HCCA. If an ADDTS request is received from an EHT device, then the soft AP on the conditional link shall specify the channel access policy as EDCA or HEMM.

Non-AP legacy STAs and non-AP EHT devices operating on the conditional link that accept admission rules shall follow the access policy agreed during admission control.

5.4.1. Example 2-1 UL TXOP Alignment

Figure 25:
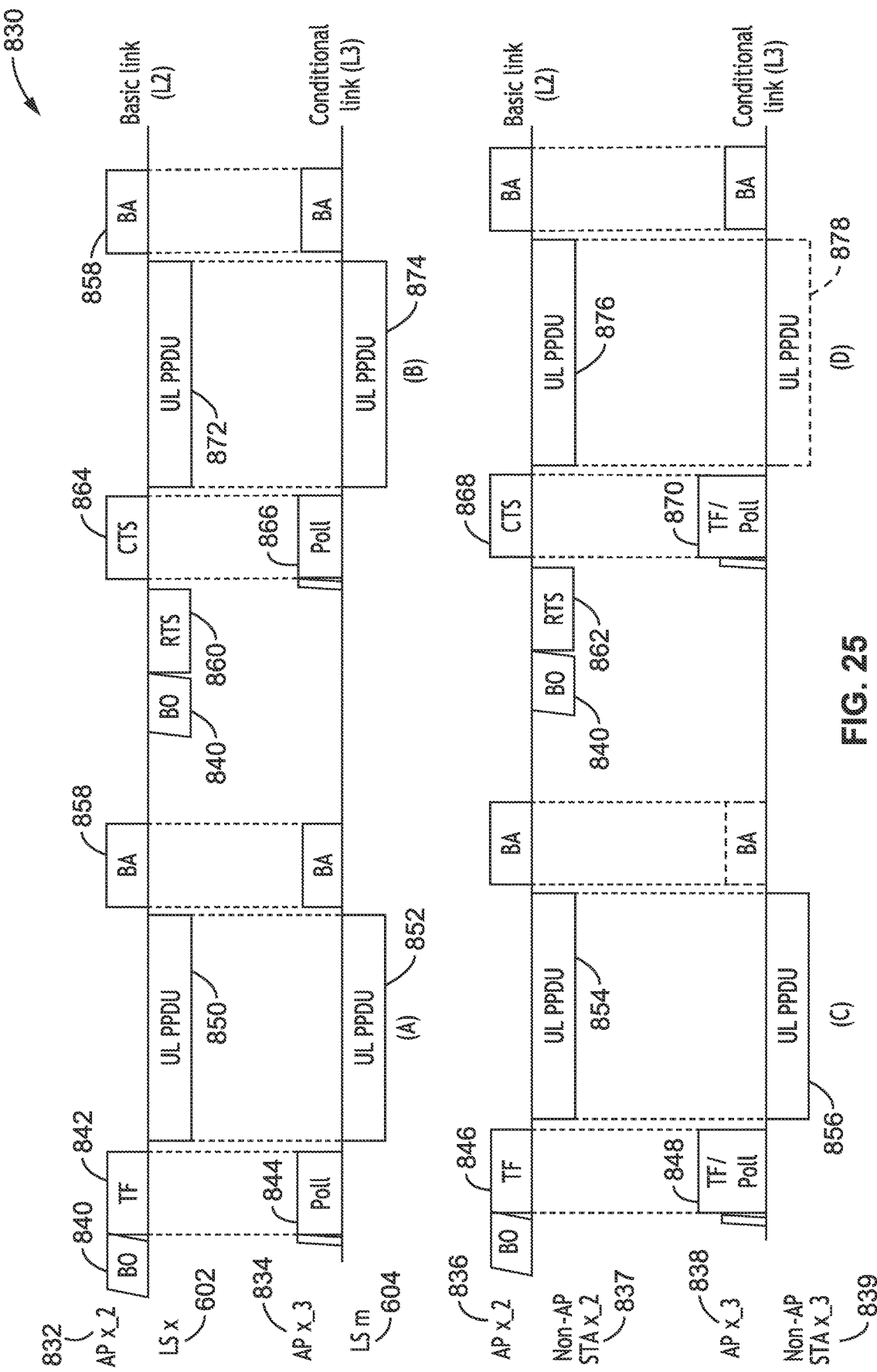
FIG. 25 is a communications diagram of an example 2-1 utilizing UL TXOP alignment according to at least one embodiment of the present disclosure.

FIG. 25 illustrates an example embodiment 830 showing for example 2-1 a UL TXOP alignment. The figure depicts interactions between APx_2 832 and LSx 602, APx_3 834 and LSm 604, APx_2 836 and non-AP STAx_2 837, and APx_3 838 and non-AP STAx_3 839.

In section (A) of the figure a basic link AP of the soft AP MLD initiates a trigger based UL TXOP for a non-EHT device by performing a backoff 840 and sending a TF 842. During the TF, the APx_3 of the same AP MLD senses the conditional link is idle at the TxPIFs boundary, and could simultaneously poll 844 any non-EHT device on the conditional link. The APs are seen receiving UL PPDUs 850 and 852 to which the APs reply with BAs 858.

In section (B) of the figure a non-EHT device initiates UL TXOP on the basic link with an RTS frame 860 following its BO 840. The AP responds with a CTS 864, during which time the conditional link AP of the same AP MLD simultaneously polls 866 any non-EHT device on the conditional link if detecting the channel is idle at a TxPIFs boundary. The APs are seen receiving UL PPDUs 872 and 874 to which the APs reply with BAs 858.

In section (C) of the figure a basic link AP of a soft AP MLD initiates UL TXOP for EHT devices with a TF 846. Simultaneous to TF 846, the AP of the soft AP MLD sends TF/QoS CF-Polls 848 on the conditional link if detecting the channel is idle at a TxPIFs boundary. The APs are seen receiving UL PPDUs 854 and 856 to which the APs reply with BAs.

In section (D) of the figure an EHT device on the basic link initiates a UL TXOP to a soft AP MLD with RTS frame 862 after BO 840, to which the AP responds with CTS 868. Simultaneous with CTS 868, the AP of the soft AP MLD send TF/QoS CF-Poll 870 on the conditional link. The APs are seen receiving UL PPDUs 876 and optionally 878 to which the APs reply with BAs.

A soft AP SME shall guarantee the alignment of each simultaneous UL and DL transmission. If the conditional link is busy (e.g., due to Overlapping Basic Service Set (OBSS) interference), the conditional link AP shall not send TF/Poll/CTS frames on the conditional link.

5.4.2. Example 2-2 DL TXOP Alignment

Figure 26:
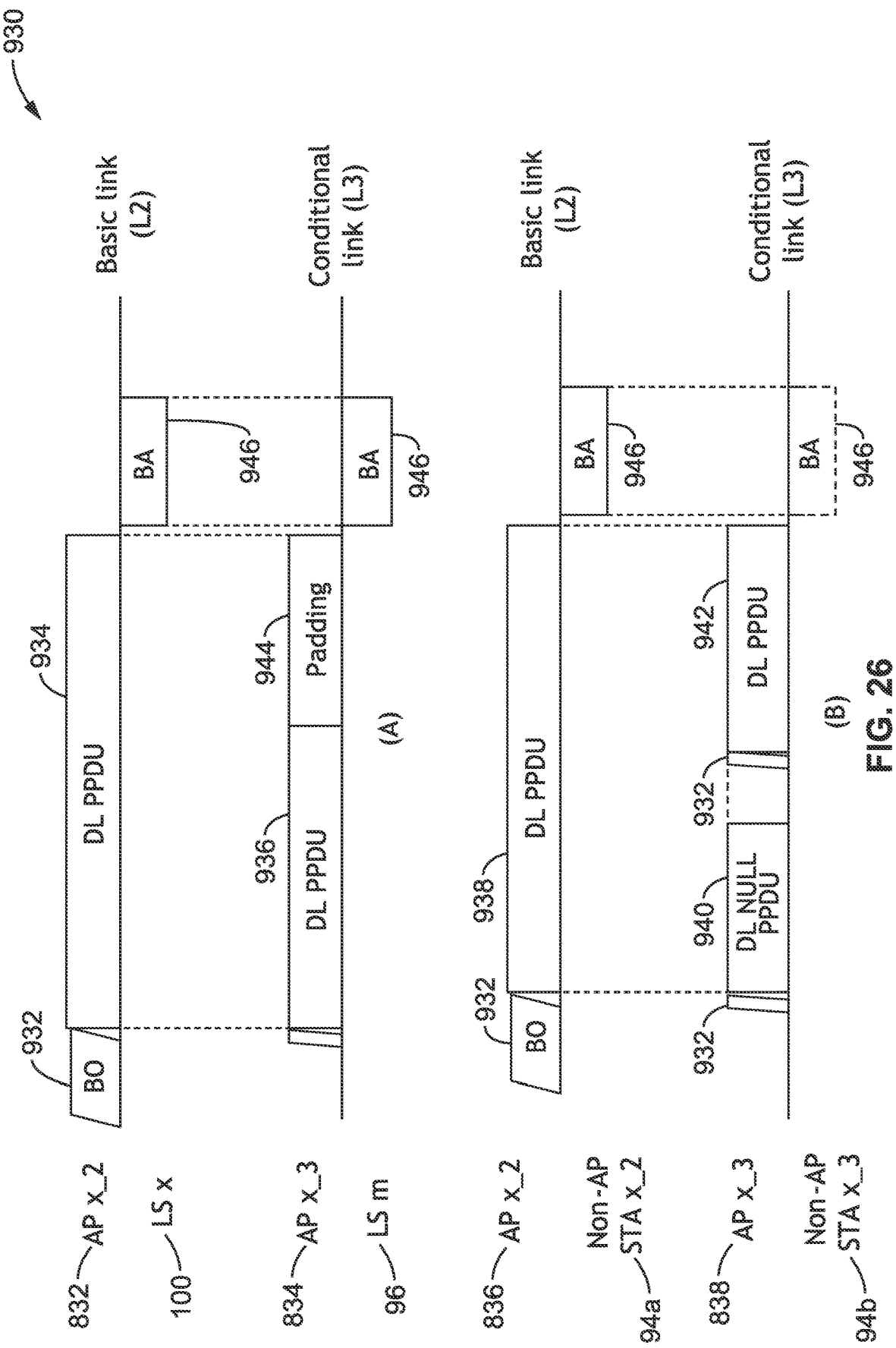
FIG. 26 is a communications diagram of an example 2-2 utilizing DL TXOP alignment according to at least one embodiment of the present disclosure.

FIG. 26 illustrates an example embodiment 930 of DL TXOP alignment for Example 2-2. The stations, as previously shown in the topology example of FIG. 9, are depicted with interactions between APx_2 832 and LSx 100, APx_3 834 and LSm 96, APx_2 836 and non-AP STAx_2 94*a*, and APx_3 838 and non-AP STAx_3 94*b*.

In section (A) of the figure it is seen that a basic link AP of a soft AP MLD initiates, after BO 932, a DL TXOP with for non-EHT device. The DL TXOP is shown with DL PPDU 934 and BA responses 946. If the conditional link is available as shown, the conditional link AP of the same soft AP MLD shall initiate DL TXOP, after detecting the conditional link idle at a TxPIFs boundary, for any non-EHT device operating on the conditional link with each DL PPDU 936 end time aligned through fragmentation or padding 944.

In section (B) of the figure the basic link AP of a soft AP MLD initiates DL TXOP, after BO 932, for EHT device. The DL TXOP is shown with DL PPDU 938 and BA responses 946. If a conditional link is available, as exemplified here, the conditional link AP of the same soft AP MLD, after sensing the conditional link is idle at a TxPIFs boundary, and may send simultaneous DL PPDU 940. If the conditional link AP has no DL PPDU to send, then this DL PPDU can be a single DL NULL PPDU with NAV set as the concurrent DL TXOP on the basic link. If the conditional link AP has DL PPDU to send after sending the DL NULL PPDU, it may send the DL PPDU 942 after sensing the conditional link idle at a TxPIFs boundary on the conditional link with the PPDU's end being in alignment with the DL PPDU from the basic link. Here it is seen that a gap arises between DL PPDU, wherein non-AP STAx_3 performs a CCA sensing for a PIFS duration, obtains the channel and transmits another DL PPDU 942 to align with the DL PPDU of the basic link.

In both (A) and (B), if a conditional link is unavailable then the AP of the conditional link shall not send DL PPDU on the conditional link.

FIG. 27A through 27D illustrate an example embodiment 970 of scheduled TXOP on conditional link according to basic link status. In this scheduled TXOP process, a check 972 determines if the conditional link is idle. If it is not idle, then the process ends in FIG. 27D. Otherwise, block 974 checks if the AP of the soft AP MLD has obtained the basic link and is initiating a TB UL TXOP. If the condition is met, then at block 976 the AP of the same soft AP MLD sends a trigger or poll frame on the conditional link simultaneously with a trigger frame on the basic link. Execution reaches block 978 in which the polled UP TXOP sets the same TXOP duration as the concurrent UL TXOP on the basic link.

Figure 27A:
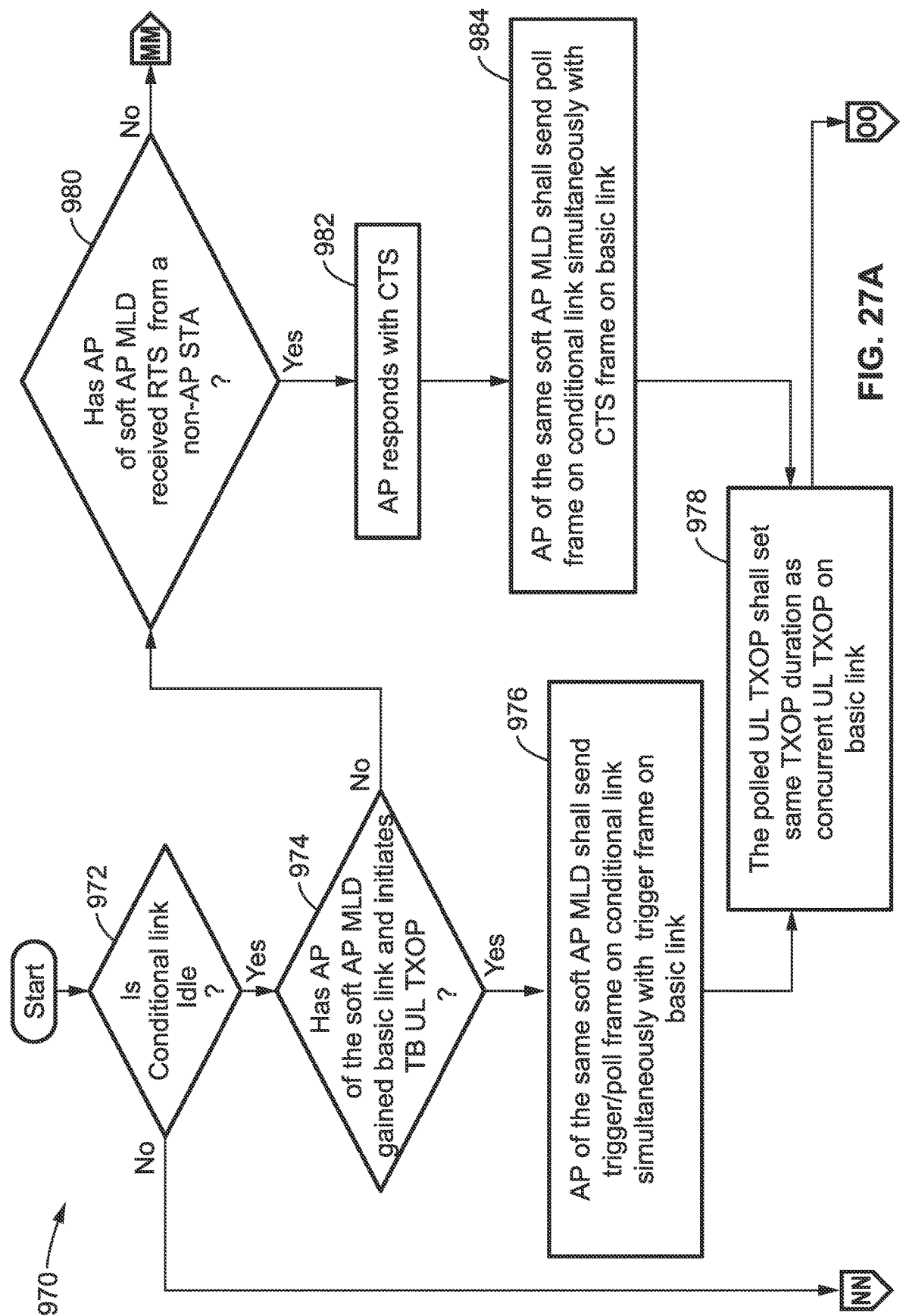
FIG. 27A through 27D is a flow diagram of scheduled TXOP on conditional link according to basic link status according to at least one embodiment of the present disclosure.
Figure 27B:
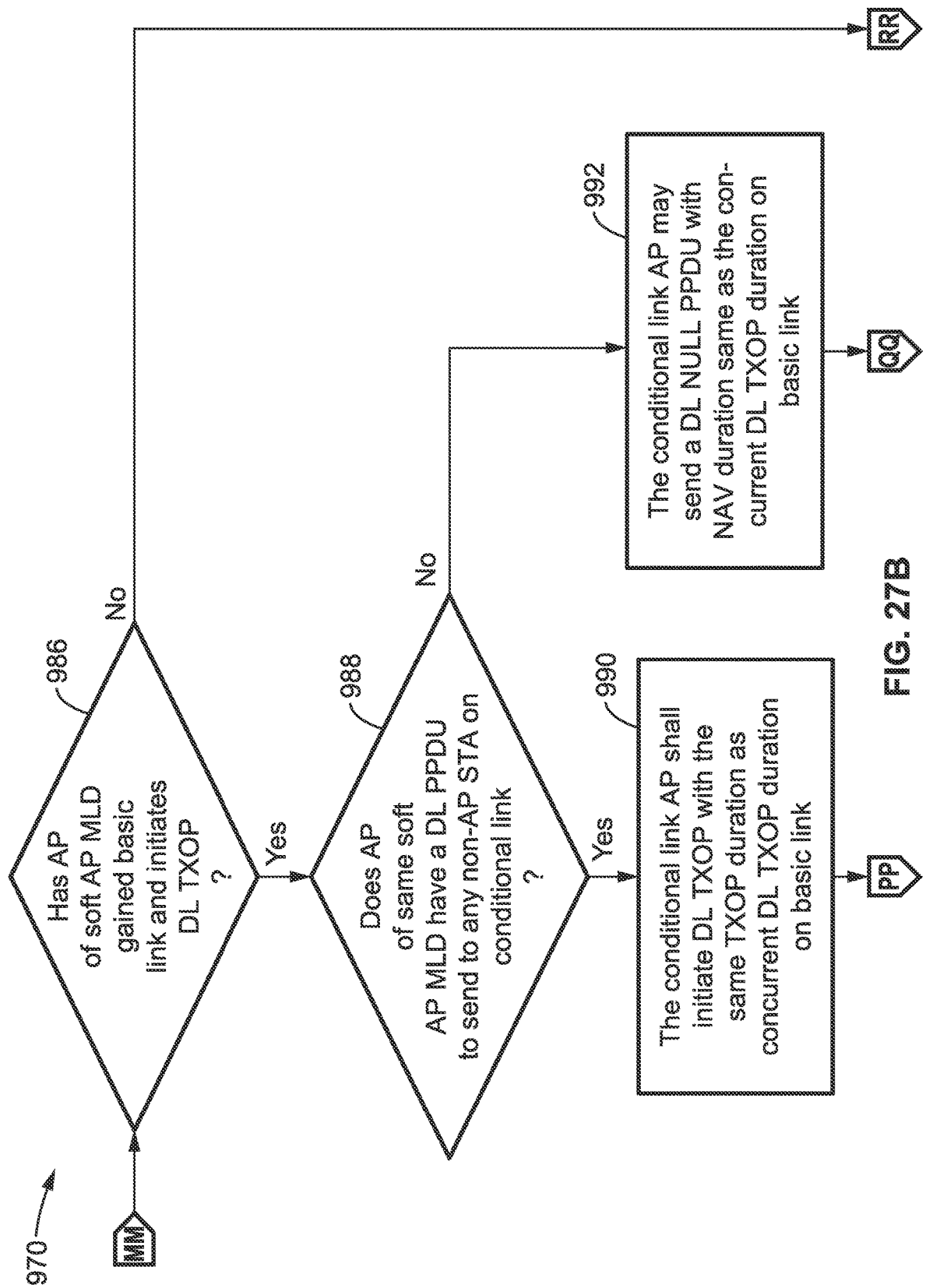
Figure 27C:
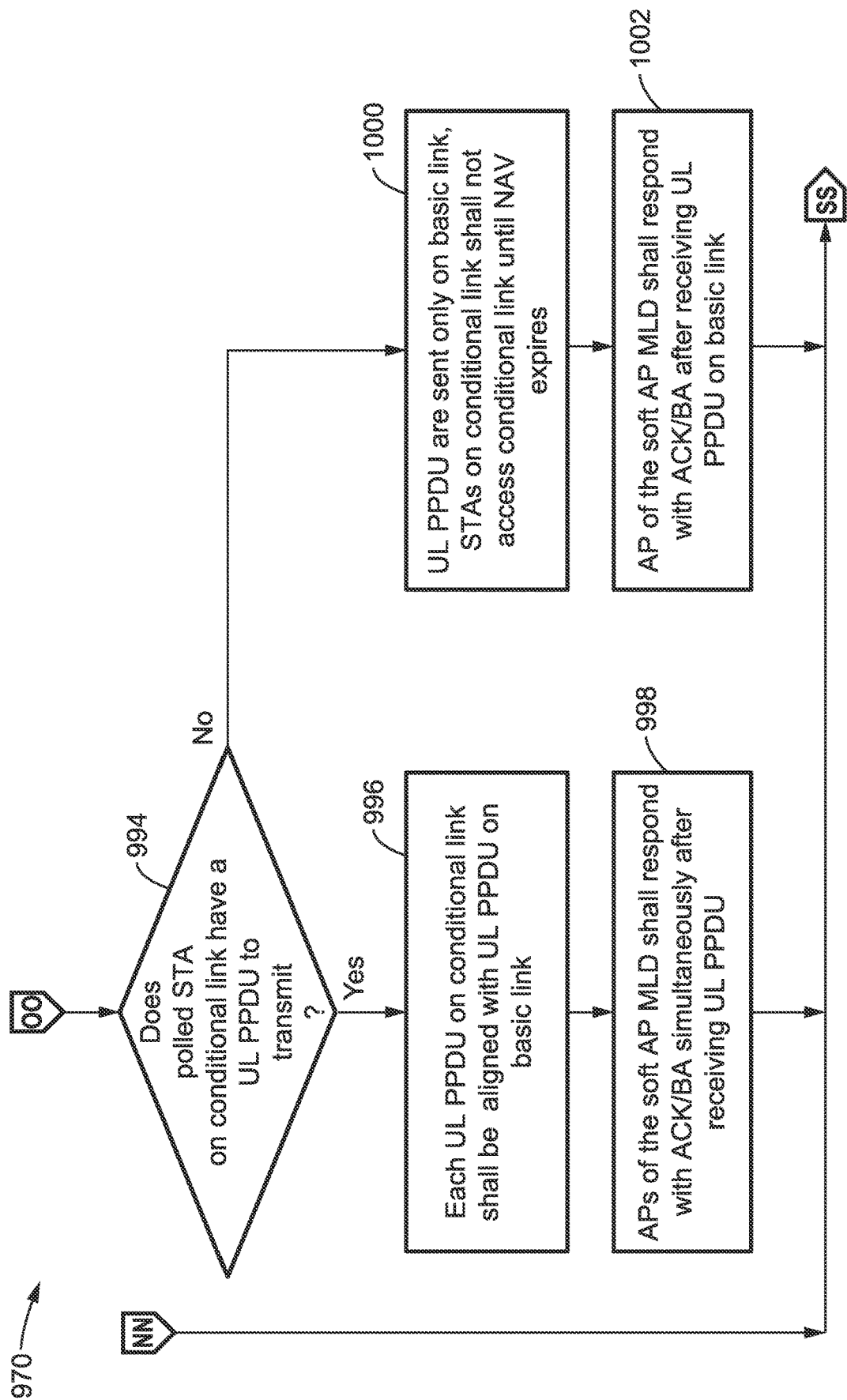

Execution moves to block 994 of FIG. 27C which checks if the polling STA on the conditional link has a UL PPDU to transmit. If there is a UL PPDU, then at block 996 each UL PPDU on the conditional link is transmitted so as to be aligned with the UL PPDU on the basic link, and in block 998 the APs of the soft AP MLD respond with an ACK/BA simultaneously on the basic link and the conditional link after receiving the UL PPDU, after which the process ends.

Returning now to block 994, in the case that the polled STA does not have a UL PPDU to transmit, then at block 1000 the UL PPDU are sent only on the basic link and STAs on the conditional link are not allowed access to the conditional link until after NAV expiration. Then in block 1002 the AP of the soft AP MLD respond with ACK/BA after receiving UL PPDU on the basic link, after which the process ends.

Returning back to block 974 of FIG. 27A for the case in which the soft AP MLD has not gained the basic link for initiating a TB UL TXOP, then block 980 is reached. Block 980 checks if the AP of the soft AP MLD has received a Ready-to-Send (RTS) from a non-AP STA. If the condition is met, then at block 982 the AP responds by sending a Clear-to-Send (CTS). After this, in block 984 the AP of the same soft AP MLD sends a polling frame on the conditional link simultaneously with a CTS frame on the basic link, and execution reaches block 978, which was previously described.

Returning now to block 980 for the case in which the AP of the soft AP MLD has not received an RTS from a non-AP STA, then execution moves to block 986 in FIG. 27B. A check is performed in block 986 to determine if the AP of the soft AP MLD has obtained the basic link and is initiating a DL TXOP. If the condition is not met, then the process ends in FIG. 27D. Otherwise, since the AP of the soft AP MLD has obtained the basic link and is initiating a DL TXOP, then in block 988 a check is made to determine if the AP of the same soft AP MLD has DL PPDU to send to any non-AP STA on the conditional link.

Figure 27D:
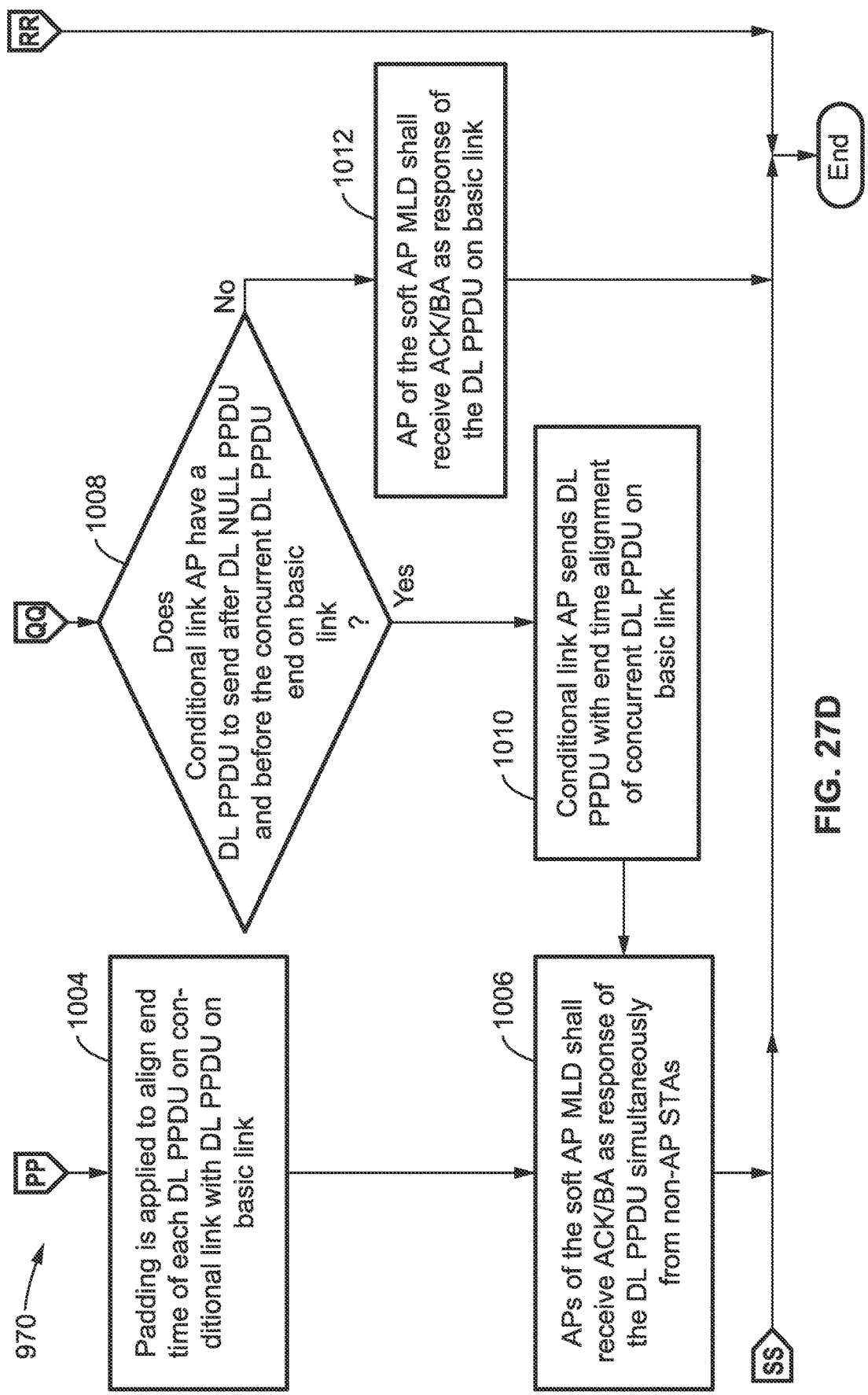

If the condition is met, then at block 990, the conditional link AP initiates a DL TXOP with the same TXOP duration as for the concurrent DL TXOP on the basic link, with execution moving to block 1004 in FIG. 27D. In block 1004 padding is applied to align the end time of each DL PPDU on the conditional link with the DL PPDU on the basic link. Then at block 1006 APs of the soft AP MLD shall simultaneously receive ACK/BA as responses of the DL PPDU from the non-AP STAs, after which this processing ends.

Returning now to block 988 of FIG. 27B for the case when the AP of the same soft AP MLD do not have a DL PPDU to send to any non-AP STA on the conditional link, so execution reaches block 992 in which the AP for the conditional link may send a DL NULL PPDU with a NAV duration which is the same as the duration of the concurrent DL TXOP duration on the basic link, after which execution moves to block 1008 of FIG. 27D.

Decision block 1008 checks if the conditional link AP has a DL PPDU to send after the DL NULL PPDU and before the concurrent DL PPDU will end on the basic link. If the condition is not met, then at block 1012 the AP of the soft AP MLD receives ACK/BA as responses to the DL PPDU of the basic link, and the process ends.

Otherwise, if the condition of block 1008 is met, then at block 1010 the conditional link AP sends a DL PPDU with end time alignment with concurrent DL PPDU on the basic link and the process ends.

6. Summary

Legacy (non-EHT) devices are able to setup a link connection on the conditional link. The scheduler shall not prevent legacy STAs from using the conditional link if no IDC interference issue will be caused at the soft AP MLD.

6.1. Methodology 1: Cooperative HCCA Schedule for Simultaneous Transmission and Reception over Basic Link and Conditional Link (1) APs on conditional link and basic link affiliate with the same soft AP MLD have the same SME and shall cooperate with each other to process simultaneous EDCA TXOPs and HCCA TXOPs over basic link and conditional link.

(2) Admission control applies to both links. TS setup/negotiation shall progress mainly in EDCA TXOPs, the schedule of HCCA TXOPs shall be based on the admitted SP info gain from TS setup. The admitted access policy shall be HCCA on basic link and conditional link.

(3) APs affiliated with the same soft AP MLD shall schedule and allocate synchronized UL or DL TXOP over both basic link and conditional link in the HCCA TXOP period. (a) The affiliated APs of the soft AP MLD may schedule synchronized HCCA TXOP based on the admitted SP info gain from TS setup e.g., mean data rate, nominal MSDU size, minimum PHY rate, surplus bandwidth allowance, and at least one of maximum service interval and delay bound, etc. (b) The affiliated APs of the soft AP MLD gains information e.g., TID, queued traffic of the STA corresponding to specific TID or the next TXOP duration request for traffic belonging to specific TID from the TID subfield and the QoS Control subfield of the received QoS Data frames for all MSDU. The APs may reallocate TXOPs if the request belongs to TS.

(4) The scheduler shall reallocate HCCA TXOP if a stream is added or dropped.

(5) The service interval (SI) for different admitted TS are not necessarily the same. The APs shall schedule TXOP accordingly.

(6) There may be multiple frame exchange sequences within a HCCA TXOP, subject to the limit on TXOP duration. the PPDU on basic link and conditional link should be aligned at start time and end time.

(7) Soft AP MLD, non-AP MLD and legacy STAs may use any type of padding to align the end time of transmitted PPDUs.

(8) Simultaneous scheduled UL/DL HCCA TXOP may applies for a) legacy STAs, b) affiliated stations of (same or different) non-AP MLD and c) affiliated station of non-AP MLD and legacy STA on basic link and conditional link.

(9) Both APs affiliate with the soft AP MLD obtain basic link and conditional link simultaneously if both links are idle at the TxPIFS slot boundary.

(10) All stations obey the NAV rules of the HCF, each frame transmitted under HCF contains a NAV duration value. (a) If the APs have no more STAs to poll and have no more Data, Management, Block Ack Req or Block Ack frame to send, it may reset the NAVs of all QoS STAs in the BSS by sending a QoS CF-Poll frame with the RA matching its own MAC address and with the Duration/ID field set to 0. (b) When a STA receives a frame addressed to it and requires an acknowledgement, it shall respond with an Ack or QoS+CF-Ack frame independent of its NAV. A non-AP STA shall accept a polled TXOP by initiating a frame exchange sequence independent of its NAV.

(11) For schedule UL HCCA TXOP:

(a) The affiliated APs of the soft AP MLD simultaneously poll non-AP stations operating on basic link and conditional link with allocating same polled TXOP duration.

(b) The polled non-AP station (which is a non-AP QoS STA that has its own address matches the address 1 field of the received QoS CF-Poll frame) shall not exceed the polled TXOP duration and may use any type of padding to maintain PPDU end time alignment on basic link and conditional link.

(b)(i) If the polled non-AP station only use partial of the allocated TXOP, the receiver AP shall not poll until the polled TXOP on the other link is finished. The affiliated APs of the soft AP MLD shall poll simultaneously.

(b)(ii) The polled non-AP station may transmit multiple frame exchange sequences within given polled TXOP, subject to the limit on TXOP duration.

(12) For scheduled DL HCCA TXOP:

(a) The affiliated APs of the soft AP MLD shall simultaneously send DL PPDU to non-AP stations operating on each link with allocating same HCCA TXOP duration.

(b) The affiliated APs of the soft AP MLD may transmit multiple frame exchange sequences within given polled TXOP, subject to the limit on TXOP duration.

(c) The affiliated APs of the soft AP MLD may use any type of padding to align the end time of transmitted PPDUs.

(13) To avoid collision caused by hidden terminal, both APs affiliate with the soft AP MLD may send a very small (compact) DL PPDU frame (e.g., RTS, null, control or management frames) on basic link and conditional link simultaneously if both links are idle at the TxPIFS slot boundary, the DL PPDU have NAV setup to protect the TXOP duration.

(a) If any AP station cannot receive the CTS/ACK/BA as a response of the DL PPDU after SIFS, it indicates that there may be a collision. Process repeats step (13), which may after aSIFSTime+n*aSlotTime, where n is a random variable.

(b) If both AP stations receive the CTS/ACK/BA as a response of the DL PPDU after SIFS, they shall poll UL TXOP or send DL TXOP simultaneously on basic link and conditional link with setting updated NAV duration.

(c) Both AP stations of the same soft AP MLD that process retransmission of the small DL PPDU may limit the retransmission times over both links (in case the interference AP as the hidden terminal sends very long DL PPDU as the interference). When the retransmission meats retransmission limitation, the AP receives the CTS/ACK/BA as the response of the short DL PPDU after SIFS should poll UL TXOP or send DL TXOP independently. The AP doesn't receive the CTS/ACK/BA as the response of the DL PPDU should not poll UL TXOP nor send DL TXOP.

(14) PS STA shall gain some QoS and admission info from the beacon.

6.2. Methodology 2: Adaptive Polling-Based Schedule on Conditional Link According to Basic Link Status (1) Stations operating on basic link access channel based on EDCA policy.

(2) Legacy (non-EHT) devices shall access the conditional link based on HCCA policy. EHT devices may access the conditional link through EDCA or HEMM, which is HCCA, EDCA mixed mode.

(3) The conditional link AP is aware of the UL/DL transmission on the basic link since the conditional link AP and the basic link AP of the same soft AP MLD have same SME.

(4) The conditional link AP schedule the UL/DL transmission on the conditional link according to the concurrent UL/DL transmission on the basic link.

(5) One or multiple frames exchange may occur in the scheduled TXOP on conditional link. The start time and end time of each PPDU of the frame exchange sequence on conditional link shall be aligned with the PPDU on basic link.

(6) Soft AP MLD, non-AP MLD and legacy STAs may use any type of padding to align the end time of transmitted PPDUs.

(7) All stations obey the NAV rules of the HCF. (same as 3) in methodology 1.

(8) AP of the soft AP MLD on conditional link may negotiate with non-AP legacy STAs to agree on a large maximum SI value during admission control.
  (a) AP of the soft AP MLD may use the maximum SI of an admitted TS for the scheduling in case it cannot service the TS at the scheduled timing, due to the simultaneous transmission and reception over basic link and conditional link or the interference on the conditional link.
  (b) If the next service start time meets the admitted maximum SI value on the conditional link, but any HCCA TXOP schedule on conditional link will causes asynchronized UL/DL transmission with concurrent basic link transmission, then AP of soft AP MLD on conditional link should not service the TS.

(9) For scheduled UL TXOP, if the conditional link is available, the conditional link AP should send poll frame to non-EHT devices on the conditional link if the QoS CF-Poll can be aligned with the trigger frame (AP initiated UL TXOP) or the CTS frame (non-AP initiated UL TXOP) send by basic link AP affiliate with the same soft AP MLD.

(10) For scheduled DL TXOP, if the conditional link is available, conditional link AP of the same soft AP MLD shall send simultaneous DL PPDU with basic link AP. If the conditional link AP has no DL PPDU to send. It may send a single DL NULL PPDU with NAV set as the concurrent DL TXOP on the basic link. If the conditional link AP has DL PPDU to send after send the DL NULL PPDU, it may send the DL PPDU on conditional link with end alignment of DL PPDU on basic link.

(11) For the scheduled UL/DL TXOP, if conditional link is unavailable, AP of the conditional link shall not send DL PPDU on conditional link.

7. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure(s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit of a soft-access point (AP) multi-link device (MLD) configured for wirelessly communicating with other wireless stations (STAs) over a basic link and a conditional link in performing a multi-link operation (MLO) on a wireless local area network (WLAN) under an IEEE 802 protocol, and is configured for allowing legacy (non-EHT) devices to setup a link connection on a conditional link; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d)(i) wherein said soft-AP MLD has an AP STA for communicating over the basic link and an AP STA for communicating over the conditional link; (d)(ii) wherein said soft AP MLD has a station management entity (SME) through which the AP STA on the basic link and the AP STA on the conditional link cooperate with each other to simultaneously process enhanced distributed channel access (EDCA) transmit opportunities (TXOPs) and HCF Controlled Channel Access (HCCA) TXOPs over the basic link and the conditional link; (d)(iii) performing admission control on both the basic link and the conditional link, with traffic stream (TS) setup and negotiation progress in EDCA TXOPs, while scheduling of HCCA TXOPs is based on admitted service period (SP) information obtained during TS setup, in which an HCCA admitted access policy is utilized on both the basic link and conditional link; and (d)(iv) wherein the APs affiliated with the same soft AP MLD schedule and allocate synchronized uplink (UL) or downlink (DL) TXOP over both the basic link and the conditional link in the HCCA TXOP period.

An apparatus for wireless communication in a network, the apparatus comprising: (a) a wireless communication circuit of a soft-access point (AP) multi-link device (MLD) configured for wirelessly communicating with other wireless stations (STAs) over a basic link and a conditional link in performing a multi-link operation (MLO) on a wireless local area network (WLAN) under an IEEE 802 protocol, and is configured for allowing legacy (non-EHT) devices to setup a link connection on a conditional link; (b) a processor coupled to said wireless communication circuit for operating on the WLAN as a STA; (c) a non-transitory memory storing instructions executable by the processor for communicating with other STAs; and (d) wherein said instructions, when executed by the processor, perform one or more steps comprising: (d)(i) accessing the basic link based on an enhanced distributed channel access (EDCA) policy; (d)(ii) accessing the conditional link based an HCF controlled channel access (HCCA) policy for legacy stations which are not configured for operating with extremely high throughput (EHT) and are thus non-EHT STAs; (d)(iii) accessing the conditional link through either EDCA or HCCA-EDCA mixed mode (HEMM); (d)(iv) wherein an Access Point (AP) accessing the conditional link can recognize that an uplink/downlink (UL/DL) transmission is being performed on the basic link as AP accessing the conditional link and the AP accessing the basic link AP of the same soft AP MLD share a station management entity (SME); (d)(v) scheduling a transmit opportunity (TXOP) as an UL/DL transmission on the conditional link by an AP of the conditional link according to the concurrent UL/DL transmission on the basic link; and (d)(vi) communicating one or multiple frames of a physical layer protocol data unit (PPDU) in a frame exchange sequence during the scheduled TXOP on the conditional link, in which start time and end time of each PPDU during the frame exchange sequence on conditional link are aligned with the PPDU being communicated on the basic link.

A method of wireless communication in a network, comprising: (a) wirelessly communicating between a soft-access point (AP) multi-link device (MLD) and other wireless stations (STAs) over a basic link and a conditional link in performing a multi-link operation (MLO) on a wireless local area network (WLAN) under an IEEE 802 protocol configured for allowing legacy (non-EHT) devices to setup a link connection on a conditional link; (b) wherein said soft-AP MLD has an AP STA for communicating over the basic link and an AP STA for communicating over the conditional link; (c) wherein said soft AP MLD has a station management entity (SME) through which the AP STA on the basic link and the AP STA on the conditional link cooperate with each other to simultaneously process enhanced distributed channel access (EDCA) transmit opportunities (TXOPs) and HCF Controlled Channel Access (HCCA) TXOPs over the basic link and the conditional link; (d) performing admission control on both the basic link and the conditional link, with traffic stream (TS) setup and negotiation progress in EDCA TXOPs, while scheduling of HCCA TXOPs is based on admitted service period (SP) information obtained during TS setup, in which an HCCA admitted access policy is utilized on both the basic link and conditional link; and (e) wherein the APs affiliated with the same soft AP MLD schedule and allocate synchronized uplink (UL) or downlink (DL) TXOP over both the basic link and the conditional link in the HCCA TXOP period.

A method of wireless communication in a network, comprising: (a) wirelessly communicating between a soft-access point (AP) multi-link device (MLD) and other wireless stations (STAs) over a basic link and a conditional link in performing a multi-link operation (MLO) on a wireless local area network (WLAN) under an IEEE 802 protocol configured for allowing legacy (non-EHT) devices to setup a link connection on a conditional link; (a) accessing the basic link based on an enhanced distributed channel access (EDCA) policy; (b) accessing the conditional link based an HCF controlled channel access (HCCA) policy for legacy stations which are not configured for operating with extremely high throughput (EHT) and are thus non-EHT STAs; (c) accessing the conditional link through either EDCA or HCCA-EDCA mixed mode (HEMM); (d) wherein an Access Point (AP) accessing the conditional link can recognize that an uplink/downlink (UL/DL) transmission is being performed on the basic link as AP accessing the conditional link and the AP accessing the basic link AP of the same soft AP MLD share a station management entity (SME); (e) scheduling a transmit opportunity (TXOP) as an UL/DL transmission on the conditional link by an AP of the conditional link according to the concurrent UL/DL transmission on the basic link; and (f) communicating one or multiple frames of a physical layer protocol data unit (PPDU) in a frame exchange sequence during the scheduled TXOP on the conditional link, in which start time and end time of each PPDU during the frame exchange sequence on conditional link are aligned with the PPDU being communicated on the basic link.

The apparatus or method of any preceding implementation, wherein scheduling and allocating synchronized UL or DL TXOP over both basic link and conditional link in the HCCA TXOP period comprises: (a) scheduling synchronized HCCA TXOP, by affiliated APs of the soft AP MLD, based on the admitted SP information gain from TS setup; and (b) obtaining information about queued traffic for the AP STA corresponding to a specific traffic identifier (TID) or the next TXOP duration request for traffic belonging to a specific TID from the TID subfield and the quality-of-service (QoS) control subfield of the received QoS data frames for all MAC service data units (MSDUs); and (c) wherein the APs of the soft-AP MLD are configured to reallocate TXOPs if the request belongs to a given TS.

The apparatus or method of any preceding implementation, wherein said admitted SP information from TS setup is selected from a group of communication information consisting of mean data rate, nominal MSDU size, minimum PHY rate, surplus bandwidth allowance, and at least one of maximum service interval and delay bound.

The apparatus or method of any preceding implementation, wherein the HCCA TXOP is reallocated by a scheduler of the STA if a stream is added or dropped.

The apparatus or method of any preceding implementation, wherein service intervals (SIs) for different admitted traffic-streams (TS) are not required to be identical, as the APs are configured for scheduling TXOPs accordingly.

The apparatus or method of any preceding implementation, wherein multiple frame exchange sequences can be performed within an HCCA TXOP, under the condition of being limit to a duration of the TXOP, and that PPDUs on the basic link and the conditional link have start times and end times which are aligned.

The apparatus or method of any preceding implementation, wherein padding can be utilized to align end times of respective PPDUs being transmitted.

The apparatus or method of any preceding implementation, wherein simultaneous scheduled UL/DL HCCA TXOP can be utilized by legacy STAs, or affiliated STAs of a same or different non-AP MLD, or affiliated STAs of non-AP MLD and legacy STA on basic link and conditional link.

The apparatus or method of any preceding implementation, wherein the APs affiliated with the soft AP MLD simultaneously obtain the basic link and the conditional link, if both links of these links are idle at the transmission PCF Interframe Space (PIFS), as a TxPIFS, slot boundary.

The apparatus or method of any preceding implementation, wherein all STAs obey NAV rules of the HCF, and each frame transmitted under HCF contains a NAV duration value.

The apparatus or method of any preceding implementation, wherein during scheduling a UL HCCA TXOP: (a) affiliated APs of the soft AP MLD simultaneously poll non-AP stations operating on the basic link and the conditional link and allocating an identical polled TXOP duration; and (b) a polled non-AP station, which is a non-AP QoS STA whose own address matches the address 1 field of the received QoS CF-Poll frame, is not allowed to exceed polled TXOP duration; (b)(i) wherein if the polled non-AP station only uses a portion of allocated TXOP, then a receiver AP does not perform polling until the polled TXOP on the other link has been completed, with affiliated APs of the soft AP MLD performing polling simultaneously; and/or (b)(ii) wherein the polled non-AP station transmits multiple frame exchange sequences within a given polled TXOP, subject to being limited by TXOP duration.

The apparatus or method of any preceding implementation, wherein scheduling for the DL HCCA TXOP is performed, comprising: (a) affiliated APs of the soft AP MLD simultaneously send DL PPDU to non-AP stations operating on each link by allocating an identical same HCCA TXOP duration; (b) affiliated APs of the soft AP MLD transmit multiple frame exchange sequences within a given polled TXOP, subject to the limit on TXOP duration; and (c) affiliated APs of the soft AP MLD can use padding to align the end time of transmitted PPDUs.

The apparatus or method of any preceding implementation, wherein to avoid collisions caused by a hidden terminal, both APs affiliated with the soft AP MLD send a DL PPDU frame without a DATA payload on the basic link and the conditional link simultaneously if both links are idle at the TxPIFS slot boundary, the DL PPDU have NAV setup to protect the TXOP duration.

The apparatus or method of any preceding implementation, wherein said DL PPDU frame is selected from the group of frames consisting of ready-to-send (RTS), null, control, or management frame.

The apparatus or method of any preceding implementation, wherein said power saving (PS) stations obtain QoS and admission information from the received beacon frames.

The apparatus or method of any preceding implementation, wherein an AP of the conditional link of the soft AP MLD negotiates with a non-AP legacy STA to agree on a large maximum SI value during admission control.

The apparatus or method of any preceding implementation, wherein if the conditional link is available for performing a scheduled UL TXOP, then the AP of the conditional link sends a poll frame to non-EHT STAs on the conditional link if the quality-of-service (QoS) contention-free (CF)-poll can be aligned with a trigger frame of an AP initiated uplink (UL) TXOP or the clear-to-send (CTS) frame of a non-AP initiated UL TXOP as sent by an AP of the basic link affiliated with the same soft AP MLD.

The apparatus or method of any preceding implementation, wherein if the conditional link is available for a scheduled DL TXOP, then the AP of the conditional link AP of the same soft AP MLD sends simultaneous downlink (DL) PPDU as being performed on the basic link.

The apparatus or method of any preceding implementation, wherein If the AP of the conditional link has no DL PPDU to send, it sends a single DL NULL PPDU with NAV set as the concurrent DL TXOP on the basic link.

The apparatus or method of any preceding implementation, wherein if the AP of the conditional link has DL PPDU to send after sending the DL NULL PPDU, it may send the DL PPDU on the conditional link and having an end alignment with the DL PPDU on basic link.

The apparatus or method of any preceding implementation, wherein if the conditional link is unavailable for a scheduled UL/DL TXOP, then the AP of the conditional link does not transmit a DL PPDU on the conditional link.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture, or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit of a soft-access point (AP) multi-link device (MLD) configured for wirelessly communicating with other wireless stations (STAs) over a basic link and a conditional link in performing a multi-link operation (MLO) on a wireless local area network (WLAN) under an IEEE 802 protocol, and is configured for allowing legacy (non-EHT) devices to setup a link connection on a conditional link;
   (b) a processor coupled to said wireless communication circuit for operating on the WLAN as a STA;
   (c) a non-transitory memory storing instructions executable by the processor for communicating with other STAs; and
   (d) wherein said instructions, when executed by the processor, perform one or more steps comprising:
      (i) wherein said soft-AP MLD has an AP STA for communicating over the basic link and an AP STA for communicating over the conditional link;
      (ii) wherein said soft AP MLD has a station management entity (SME) through which the AP STA on the basic link and the AP STA on the conditional link cooperate with each other to simultaneously process enhanced distributed channel access (EDCA) transmit opportunities (TXOPs) and hybrid coordination function (HCF) controlled channel access (HCCA) TXOPs over the basic link and the conditional link;

(iii) performing admission control on both the basic link and the conditional link, with traffic stream (TS) setup and negotiation progress in EDCA TXOPs, while scheduling of HCCA TXOPs is based on admitted service period (SP) information obtained during TS setup, in which an HCCA admitted access policy is utilized on both the basic link and conditional link; and (iv) wherein the APs affiliated with the same soft AP MLD schedule and allocate synchronized uplink (UL) or downlink (DL) TXOP over both the basic link and the conditional link in the HCCA TXOP period.

2. The apparatus of claim 1, wherein scheduling and allocating synchronized UL or DL TXOP over both basic link and conditional link in the HCCA TXOP period comprises:

(a) scheduling synchronized HCCA TXOP, by affiliated APs of the soft AP MLD, based on the admitted SP information gain from TS setup; and (b) obtaining information about queued traffic for the AP STA corresponding to a specific traffic identifier (TID) or the next TXOP duration request for traffic belonging to a specific TID from the TID subfield and the quality-of-service (QoS) control subfield of the received QoS data frames for all MAC service data units (MSDUs); and (c) wherein the APs of the soft-AP MLD are configured to reallocate TXOPs if the request belongs to a given TS.

3. The apparatus of claim 1, wherein said admitted SP information from TS setup is selected from a group of communication information consisting of mean data rate, nominal MSDU size, minimum PHY rate, surplus bandwidth allowance, and at least one of maximum service interval and delay bound.

4. The apparatus of claim 1, wherein the HCCA TXOP is reallocated by a scheduler of the STA if a stream is added or dropped.

5. The apparatus of claim 1, wherein service intervals (SIs) for different admitted traffic-streams (TS) are not required to be identical, as the APs are configured for scheduling TXOPs accordingly.

6. The apparatus of claim 1, wherein multiple frame exchange sequences can be performed within an HCCA TXOP, under the condition of being limited to a duration of the TXOP, and that PPDUs on the basic link and the conditional link have start times and end times which are aligned.

7. The apparatus of claim 1, wherein padding is utilized to align end times of respective PPDUs being transmitted.

8. The apparatus of claim 1, wherein simultaneous scheduled UL/DL HCCA TXOP are be utilized by legacy STAs, or affiliated STAs of a same or different non-AP MLD, or affiliated STAs of non-AP MLD and legacy STA on basic link and conditional link.

9. The apparatus of claim 1, wherein the APs affiliated with the soft AP MLD simultaneously obtain the basic link and the conditional link, if both of these links are idle at the transmission PCF interframe space (PIFS), as a TxPIFS, slot boundary.

10. The apparatus of claim 1, wherein all STAs obey NAV rules of the HCF, and each frame transmitted under HCF contains a NAV duration value.

11. The apparatus of claim 1, wherein during scheduling an uplink (UL) HCCA TXOP:

(a) affiliated APs of the soft AP MLD simultaneously poll non-AP stations operating on the basic link and the conditional link and allocating of an identical polled TXOP duration; and (b) a polled non-AP station, which is a non-AP QoS STA whose own address matches the address 1 field of the received QoS CF-Poll frame, is not allowed to exceed a polled TXOP duration;

(i) wherein if the polled non-AP station only uses a portion of allocated TXOP, then a receiver AP does not perform polling until the polled TXOP on the other link has been completed, with affiliated APs of the soft AP MLD performing polling simultaneously; and/or (ii) wherein the polled non-AP station transmits multiple frame exchange sequences within a given polled TXOP, subject to being limited by TXOP duration.

12. The apparatus of claim 1, wherein scheduling for the DL HCCA TXOP is performed, comprising:

(a) affiliated APs of the soft AP MLD simultaneously send DL PPDU to non-AP stations operating on each link by allocating an identical HCCA TXOP duration;

(b) affiliated APs of the soft AP MLD transmit multiple frame exchange sequences within a given polled TXOP, subject to the limit on TXOP duration; and (c) affiliated APs of the soft AP MLD use padding to align the end time of transmitted PPDUs.

13. The apparatus of claim 1, wherein to avoid collisions caused by a hidden terminal, both APs affiliated with the soft AP MLD send a DL PPDU frame without a DATA payload on the basic link and the conditional link simultaneously if both links are idle at the TxPIFS slot boundary, in which the DL PPDU has a NAV setup to protect the TXOP duration.

14. The apparatus of claim 1, wherein said DL PPDU frame without a DATA payload is selected from the group of frames consisting of ready-to-send (RTS), null, control, or management frame.

15. The apparatus of claim 1, wherein said power saving (PS) stations obtain QoS and admission information from the received beacon frames.

16. An apparatus for wireless communication in a network, the apparatus comprising:

(a) a wireless communication circuit of a soft-access point (AP) multi-link device (MLD) configured for wirelessly communicating with other wireless stations (STAs) over a basic link and a conditional link in performing a multi-link operation (MLO) on a wireless local area network (WLAN) under an IEEE 802 protocol, and is configured for allowing legacy (non-EHT) devices to setup a link connection on a conditional link;

(b) a processor coupled to said wireless communication circuit for operating on the WLAN as a STA;

(c) a non-transitory memory storing instructions executable by the processor for communicating with other STAs; and (d) wherein said instructions, when executed by the processor, perform one or more steps comprising:

(i) accessing the basic link based on an enhanced distributed channel access (EDCA) policy;

(ii) accessing the conditional link based on hybrid coordination function (HCF) controlled channel access (HCCA) policy for legacy stations which are not configured for operating with extremely high throughput (EHT) and are thus non-EHT STAs;
(iii) accessing the conditional link through either EDCA or HCCA-EDCA mixed mode (HEMM);
(iv) wherein an Access Point (AP) accessing the conditional link recognizes that an uplink/downlink (UL/DL) transmission is being performed on the basic link as AP accessing the conditional link and the AP accessing the basic link AP of the same soft AP MLD sharing a station management entity (SME);
(v) scheduling a transmit opportunity (TXOP) as an UL/DL transmission on the conditional link by an AP of the conditional link according to the concurrent UL/DL transmission on the basic link; and
(vi) communicating one or multiple frames of a physical layer protocol data unit (PPDU) in a frame exchange sequence during the scheduled TXOP on the conditional link, in which start time and end time of each PPDU during the frame exchange sequence on conditional link are aligned with the PPDU being communicated on the basic link.

17. The apparatus of claim 16, wherein padding may be utilized to align the end times of transmitted PPDUs.

18. The apparatus of claim 16, wherein STAs obey the network allocation vector (NAV) rules of a hybrid coordination function (HCF) under IEEE802.11.

19. The apparatus of claim 16, wherein an AP of the conditional link of the soft AP MLD negotiates with a non-AP legacy STA to agree on a maximum SI value during admission control.

20. The apparatus of claim 16, wherein if the conditional link is available for performing a scheduled UL TXOP, then the AP of the conditional link sends a poll frame to non-EHT STAs on the conditional link if the quality-of-service (QoS) contention-free (CF)-poll can be aligned with a trigger frame of an AP initiated uplink (UL) TXOP or the clear-to-send (CTS) frame of a non-AP initiated UL TXOP as sent by an AP of the basic link affiliated with the same soft AP MLD.

21. The apparatus of claim 16, wherein if the conditional link is available for a scheduled DL TXOP, then the AP of the conditional link AP of the same soft AP MLD sends simultaneous downlink (DL) PPDU as being performed on the basic link.

22. The apparatus of claim 21, wherein If the AP of the conditional link has no DL PPDU to send, it sends a single DL NULL PPDU with NAV set as the concurrent DL TXOP on the basic link.

23. The apparatus of claim 22, wherein if the AP of the conditional link has DL PPDU to send after sending the DL NULL PPDU, and sends the DL PPDU on the conditional link and having an end alignment with the DL PPDU on the basic link.

24. The apparatus of claim 23, wherein if the conditional link is unavailable for a scheduled UL/DL TXOP, then the AP of the conditional link does not transmit a DL PPDU on the conditional link.

25. A method of wireless communication in a network, comprising:
(a) wirelessly communicating between a soft-access point (AP) multi-link device (MLD) and other wireless stations (STAs) over a basic link and a conditional link in performing a multi-link operation (MLO) on a wireless local area network (WLAN) under an IEEE 802 protocol configured for allowing legacy (non-EHT) devices to setup a link connection on a conditional link;
(b) wherein said soft-AP MLD has an AP STA for communicating over the basic link and an AP STA for communicating over the conditional link;
(c) wherein said soft AP MLD has a station management entity (SME) through which the AP STA on the basic link and the AP STA on the conditional link cooperate with each other to simultaneously process enhanced distributed channel access (EDCA) transmit opportunities (TXOPs) and HCF Controlled Channel Access (HCCA) TXOPs over the basic link and the conditional link;
(d) performing admission control on both the basic link and the conditional link, with traffic stream (TS) setup and negotiation progress in EDCA TXOPs, while scheduling of HCCA TXOPs is based on admitted service period (SP) information obtained during TS setup, in which an HCCA admitted access policy is utilized on both the basic link and conditional link; and
(e) wherein the APs affiliated with the same soft AP MLD schedule and allocate synchronized uplink (UL) or downlink (DL) TXOP over both the basic link and the conditional link in the HCCA TXOP period.

26. A method of wireless communication in a network, comprising:
(a) wirelessly communicating between a soft-access point (AP) multi-link device (MLD) and other wireless stations (STAs) over a basic link and a conditional link in performing a multi-link operation (MLO) on a wireless local area network (WLAN) under an IEEE 802 protocol configured for allowing legacy (non-EHT) devices to setup a link connection on a conditional link;
(b) accessing the basic link based on an enhanced distributed channel access (EDCA) policy;
(c) accessing the conditional link based on an HCF controlled channel access (HCCA) policy for legacy stations which are not configured for operating with extremely high throughput (EHT) and are thus non-EHT STAs;
(d) accessing the conditional link through either EDCA or HCCA-EDCA mixed mode (HEMM);
(e) wherein an Access Point (AP) accessing the conditional link recognizes that an uplink/downlink (UL/DL) transmission is being performed on the basic link as the AP accessing the conditional link and the AP accessing the basic link AP of the same soft AP MLD share a station management entity (SME);
(f) scheduling a transmit opportunity (TXOP) as an UL/DL transmission on the conditional link by the AP of the conditional link according to the concurrent UL/DL transmission on the basic link; and
(g) communicating one or multiple frames of a physical layer protocol data unit (PPDU) in a frame exchange sequence during the scheduled TXOP on the conditional link, in which start time and end time of each PPDU during the frame exchange sequence on the conditional link are aligned with the PPDU being communicated on the basic link.

* * * * *